United States Patent
Ren

(10) Patent No.: US 10,740,044 B2
(45) Date of Patent: Aug. 11, 2020

(54) IMAGE PROCESSING DEVICE, NON-TRANSITORY COMPUTER-READABLE RECORDING MEDIUM STORING COMPUTER-READABLE INSTRUCTIONS FOR IMAGE PROCESSING DEVICE, AND METHOD

(71) Applicant: Brother Kogyo Kabushiki Kaisha, Nagoya-shi, Aichi (JP)

(72) Inventor: Yongyong Ren, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 127 days.

(21) Appl. No.: 15/939,458

(22) Filed: Mar. 29, 2018

(65) Prior Publication Data

US 2019/0047307 A1 Feb. 14, 2019

(30) Foreign Application Priority Data

Aug. 10, 2017 (JP) .................................. 2017-155986

(51) Int. Cl.
*G06F 3/12* (2006.01)

(52) U.S. Cl.
CPC .............. *G06F 3/1203* (2013.01); *G06F 3/12* (2013.01); *G06F 3/1239* (2013.01); *G06F 3/1288* (2013.01)

(58) Field of Classification Search
CPC ............... G06F 3/00; G06F 3/12–1204; G06F 3/1222–1224; G06F 3/1229; G06F 3/1232; G06F 3/1236–1239; G06F 3/1285; G06F 3/1288; G06F 21/00; G06F 21/30; G06F 21/31; G06F 21/50; G06F 21/62; G06F 21/629; H04L 41/00; H04L 41/08; H04L 41/0803; H04L 63/00; H04L 63/08; H04L 63/0876; H04L 63/10
See application file for complete search history.

(56) References Cited

U.S. PATENT DOCUMENTS

| | | | |
|---|---|---|---|
| 6,985,243 B1 * | 1/2006 | Matsueda | G06F 3/1214 358/1.1 |
| 9,019,529 B2 * | 4/2015 | Ito | G06F 3/1203 358/1.15 |

(Continued)

FOREIGN PATENT DOCUMENTS

JP 2012-190337 A 10/2012

*Primary Examiner* — Tauqir Hussain
*Assistant Examiner* — Boris D Grijalva Lobos
(74) *Attorney, Agent, or Firm* — Banner & Witcoff, Ltd.

(57) ABSTRACT

An image processing device may acquire first process specifying information, in a case where an input of a registration instruction is received; send, to the server, a registration request including second process specifying information obtained by using the acquired first process specifying information, in the server, the second process specifying information may be registered; receive an execution request of a second image process from the server, in a case where an execution of the second image process is instructed to the server from a target user via a terminal device, the second image process being an image process among the one or more image processes specified by the registered second process specifying information; and cause an image process executing unit to execute the second image process, in a case where the execution request is received from the server.

17 Claims, 13 Drawing Sheets

(56) References Cited

U.S. PATENT DOCUMENTS

| | | | | |
|---|---|---|---|---|
| 2002/0001099 A1* | 1/2002 | Okuda | .................. | G06Q 30/04 358/1.15 |
| 2006/0033947 A1* | 2/2006 | Kadota | ................ | G06F 3/1222 358/1.14 |
| 2006/0132866 A1* | 6/2006 | Okamoto | .............. | G06F 3/1204 358/502 |
| 2006/0195596 A1* | 8/2006 | Kawai | ................... | G06F 3/1204 709/229 |
| 2010/0053673 A1* | 3/2010 | Oba | ....................... | G03G 21/02 358/1.15 |
| 2010/0079805 A1* | 4/2010 | Hashimoto | ........... | G06F 21/608 358/1.15 |
| 2010/0265530 A1* | 10/2010 | Takechi | ................ | G06F 21/608 358/1.14 |
| 2011/0170139 A1* | 7/2011 | Shozaki | ................ | G03G 21/02 358/1.15 |
| 2011/0261374 A1* | 10/2011 | Okamura | ............. | G06F 3/1219 358/1.9 |
| 2012/0086980 A1* | 4/2012 | Numata | ................ | G06F 3/1204 358/1.15 |
| 2012/0274975 A1* | 11/2012 | Uemura | ................ | G06F 3/1211 358/1.14 |
| 2013/0024913 A1* | 1/2013 | Lim | ...................... | G06F 3/1204 726/4 |
| 2015/0116756 A1* | 4/2015 | Mori | .................... | G06F 3/1204 358/1.14 |
| 2015/0193615 A1* | 7/2015 | Hosoda | .................. | G06F 21/31 726/18 |
| 2016/0105587 A1* | 4/2016 | Sugiyama | ........... | H04N 1/4413 358/1.14 |

* cited by examiner

FIG. 3

User Management Table 38 (First Embodiment)

| Registration State | Unregistered | Unregistered | ... |
|---|---|---|---|
| Login State | Login | Logout | ... |
| User ID | User1 | User2 | ... |
| Password | P1 | P2 | ... |
| Account Information | NONE | NONE | ... |
| Management ID | NONE | NONE | ... |
| Token | NONE | NONE | ... |
| Monochrome Print | ○ | ○ | ... |
| Color Print | × | ○ | ... |
| Monochrome Scan | × | ○ | ... |
| Color Scan | × | ○ | ... |

Image Process Limitation Information: { Monochrome Print, Color Print, Monochrome Scan, Color Scan }

↑

| Registration State | Registered | Unregistered | ... |
|---|---|---|---|
| Login State | Logout | Logout | ... |
| User ID | User1 | User2 | ... |
| Password | P1 | P2 | ... |
| Account Information | AI1 | NONE | ... |
| Management ID | Printer1 | NONE | ... |
| Token | AT1 | NONE | ... |
| Monochrome Print | ○ | ○ | ... |
| Color Print | × | ○ | ... |
| Monochrome Scan | × | ○ | ... |
| Color Scan | × | ○ | ... |

Image Process Limitation Information: { Monochrome Print, Color Print, Monochrome Scan, Color Scan }

(Normal Print Process)

(First to Third Embodiments: Sever Print Process)
(Case B)

FIG. 11

User Management Table 38 (Second Embodiment)

| Registration State | Unregistered | Unregistered | ... |
|---|---|---|---|
| Login State | Login | Logout | ... |
| User ID | User1 | User2 | ... |
| Password | P1 | P2 | ... |
| Account Information | AI1 | AI2 | ... |
| Management ID | NONE | NONE | ... |
| Token | NONE | NONE | ... |
| Image Process Limitation Information — Monochrome Print | ○ | ○ | ... |
| Image Process Limitation Information — Color Print | × | ○ | ... |
| Image Process Limitation Information — Monochrome Scan | × | ○ | ... |
| Image Process Limitation Information — Color Scan | × | ○ | ... |

↓

| Registration State | Registered | Unregistered | ... |
|---|---|---|---|
| Login State | Logout | Logout | ... |
| User ID | User1 | User2 | ... |
| Password | P1 | P2 | ... |
| Account Information | AI1 | AI2 | ... |
| Management ID | Printer1 | NONE | ... |
| Token | AT1 | NONE | ... |
| Image Process Limitation Information — Monochrome Print | ○ | ○ | ... |
| Image Process Limitation Information — Color Print | × | ○ | ... |
| Image Process Limitation Information — Monochrome Scan | × | ○ | ... |
| Image Process Limitation Information — Color Scan | × | ○ | ... |

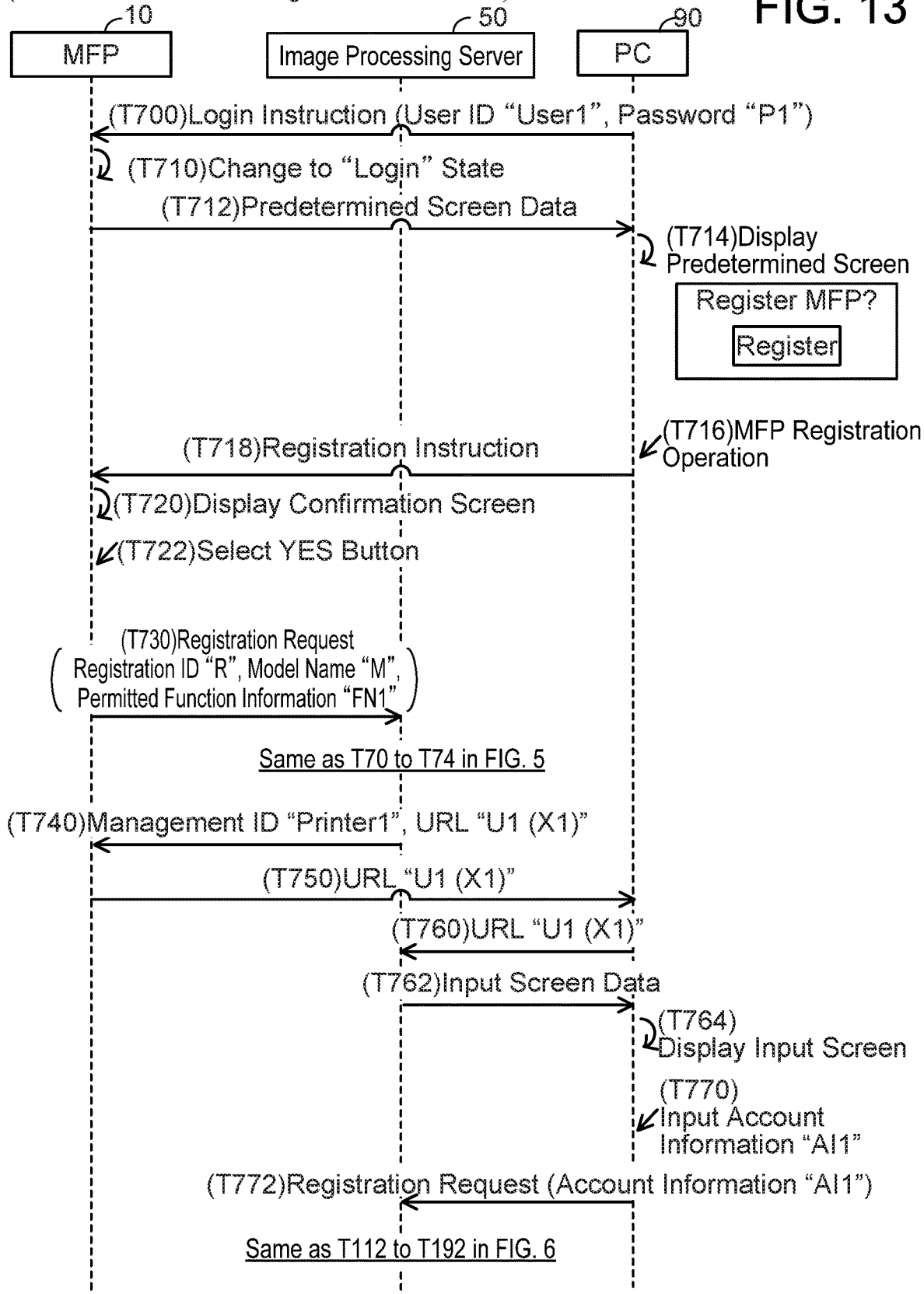

IMAGE PROCESSING DEVICE, NON-TRANSITORY COMPUTER-READABLE RECORDING MEDIUM STORING COMPUTER-READABLE INSTRUCTIONS FOR IMAGE PROCESSING DEVICE, AND METHOD

TECHNICAL FIELD

The disclosure herein discloses a technique for causing an image processing device to execute an image process via a server.

BACKGROUND ART

A printer sends login information and capability information, which indicates a printer name and a print condition that this printer is capable of executing, to a storage management server to have the information stored in the storage management server. When the storage management server is logged in from a PC, the server sends data representing a print setting screen according to the aforementioned capability information to the PC. Then, the storage management server receives print data and condition data indicating a print condition selected in the print setting screen from the PC, and sends the information to the printer to cause the printer to execute printing.

SUMMARY

For example, a situation will be assumed, in which only a part of print conditions that a printer is capable of executing is permitted to a specific user of the printer (for example, only monochrome print is permitted when the printer is capable of color print and monochrome print). In the above technique, capability information indicating all the print conditions that the printer is capable of executing is sent to the storage management server, and a print setting screen according to this capability information is displayed on the PC. Due to this, there is a possibility that a print condition that is not permitted to the specific user may be selected in the print setting screen, and printing according to this print condition may be executed in the printer.

The disclosure herein discloses a technique for suppressing an image process, of which use is not permitted to a target user, from being executed by an image processing device in a system that causes the image processing device to execute an image process via a server.

An image processing device disclosed herein may comprise: an image process executing unit configured to execute a plurality of image processes; and a controller configured to: cause the image process executing unit to execute a first image process among the plurality of image processes, in a case where an execution of the first image process permitted to be used by a target user is instructed from the target user not via a server, wherein it is specified based on a memory that the first image process is permitted to be used by the target user, the memory may be capable of storing plural pieces of process specifying information corresponding to a plurality of users, and each of the plural pieces of process specifying information may be information for specifying one or more image processes permitted to be used by the user corresponding to the process specifying information among the plurality of image processes which are executable by the image process executing unit; receive via the server an input of a registration instruction for the target user who is to use the image processing device; acquire first process specifying information corresponding to the target user among the plural pieces of process specifying information in the memory, in a case where the input of the registration instruction is received; send, to the server, a registration request including second process specifying information obtained by using the acquired first process specifying information, wherein the second process specifying information may be information for specifying one or more image processes permitted to be used by the target user among the plurality of image processes, and in the server, in a case where the registration request is received from the image processing device, the second process specifying information included in the registration request may be registered; receive an execution request of a second image process from the server, in a case where an execution of the second image process is instructed to the server from the target user via a terminal device, the second image process being an image process among the one or more image processes specified by the registered second process specifying information; and cause the image process executing unit to execute the second image process, in a case where the execution request is received from the server.

A method, and a non-transitory computer-readable recording medium storing the aforementioned computer-readable instructions are also novel and useful. Further, a communication system which comprises the aforementioned image processing device and other device(s) (e.g., a terminal device and/or a server) is also novel and useful.

BRIEF DESCRIPTION OF THE DRAWINGS

FIG. 3 shows a user management table.
FIG. 11 shows a user management table of a second embodiment.
FIG. 13 shows a sequence diagram of a registration process of a third embodiment.

EMBODIMENTS

First Embodiment

Figure 1:
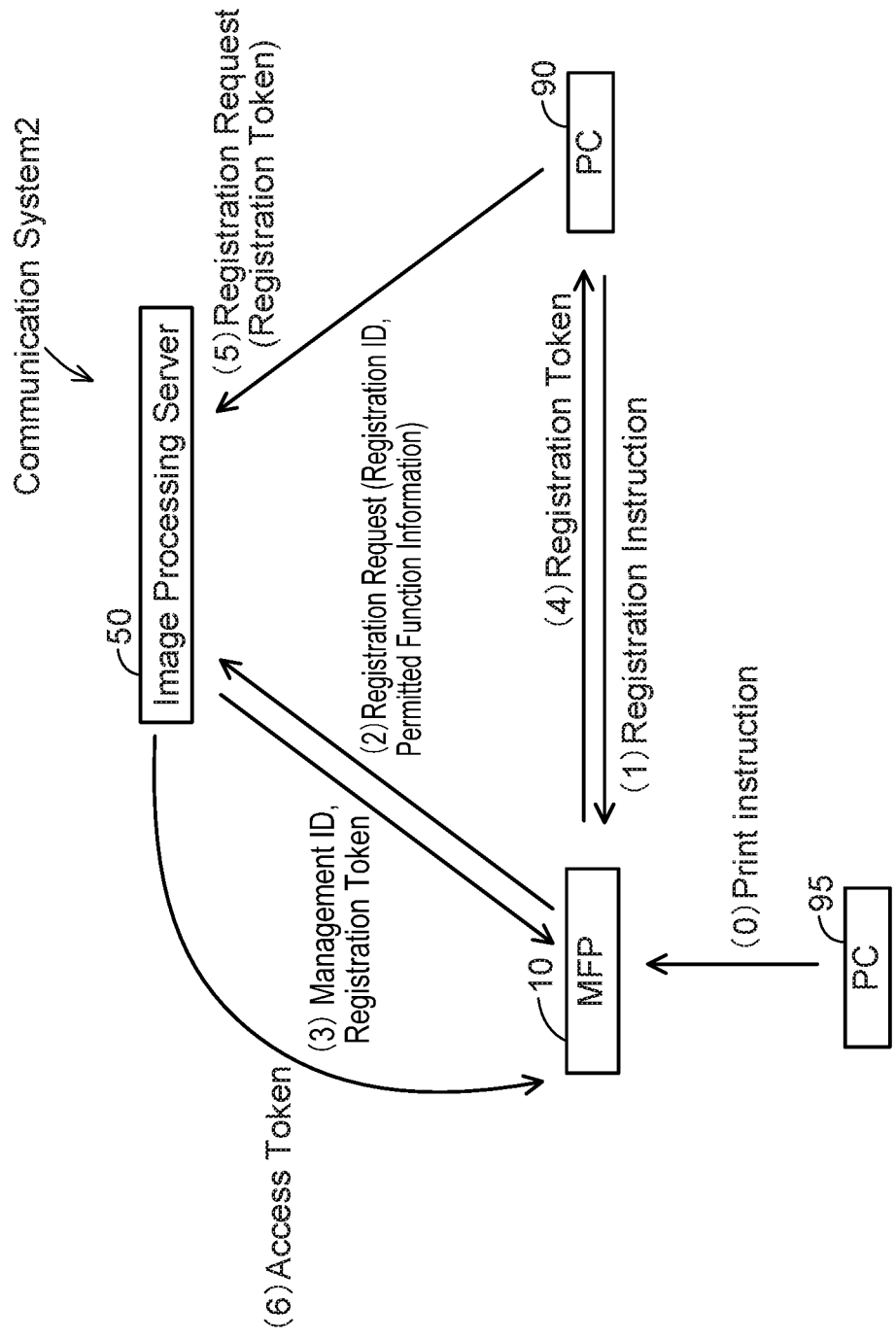
FIG. 1 shows an explanatory diagram for explaining an overview of an embodiment.

Embodiment Overview; FIG. 1

An overview of this embodiment will be described with reference to FIG. 1. A communication system 2 comprises a multi-function peripheral 10, an image processing server 50, and PCs (abbreviation of Personal Computer) 90, 95. Hereinbelow, the multi-function peripheral 10 may be termed "MFP 10", and the image processing server 50 may simply be termed "server 50".

The PC 95 is provided with a printer driver for the MFP 10, and is capable of causing the MFP 10 to execute printing without using the server 50. Thus, as shown in a process (0), the MFP 10 receives a print instruction including print data representing a print target image and the like from the PC 95 without involving the server 50. In this case, the MFP 10 executes printing according to this print data.

On the other hand, the PC 90 is not provided with a printer driver, thus it causes the MFP 10 to execute printing using the server 50. To realize such a system, the MFP 10 needs to be registered in the server 50 in advance. Following processes (1) to (6) are executed to register the MFP 10 in the server 50.

(1) The MFP 10 receives an input of a registration instruction for registering the MFP 10 in the server 50 from the PC 90. In this case, (2) the MFP 10 sends a registration request including a registration ID and permitted function information to the server 50. The registration ID is information for identifying the MFP 10. The permitted function information is information for specifying one or more image processes of which use is permitted to a user of the MFP 10 among plural image processes that the MFP 10 is capable of executing.

(3) After having sent the registration request to the server 50, the MFP 10 receives a registration token and a management ID that is different from the registration ID from the server 50. The management ID is information for the server 50 to identify the MFP 10 in order to manage the MFP 10. Then, (4) the MFP 10 sends the registration token to the PC 90. As a result, (5) a registration request including the received registration token is sent from the PC 90 to the server 50. (6) The MFP 10 receives an access token from the server 50 after the registration request has been sent from the PC 90 to the server 50. When such a registration process is executed, information of the MFP 10 (such as the registration ID, the management ID, the permitted function information, and the access token) is registered in the server 50. According to this, the MFP 10 becomes capable of executing a communication of print data with the server 50 using the access token.

When the above registration process is executed, a user of the PC 90 can send an image file or the like representing a print target image from the PC 90 to the server 50. In this case, conversion of this image file to print data including a data format that can be interpreted by the MFP 10 is executed by the server 50, this print data is sent from the server 50 to the MFP 10, and printing according to the print data is executed by the MFP 10. As above, the user can cause the MFP 10 to execute printing using the server 50, despite the PC 90 not being provided with a printer driver.

(Configuration of Communication System 2)

Figure 2:
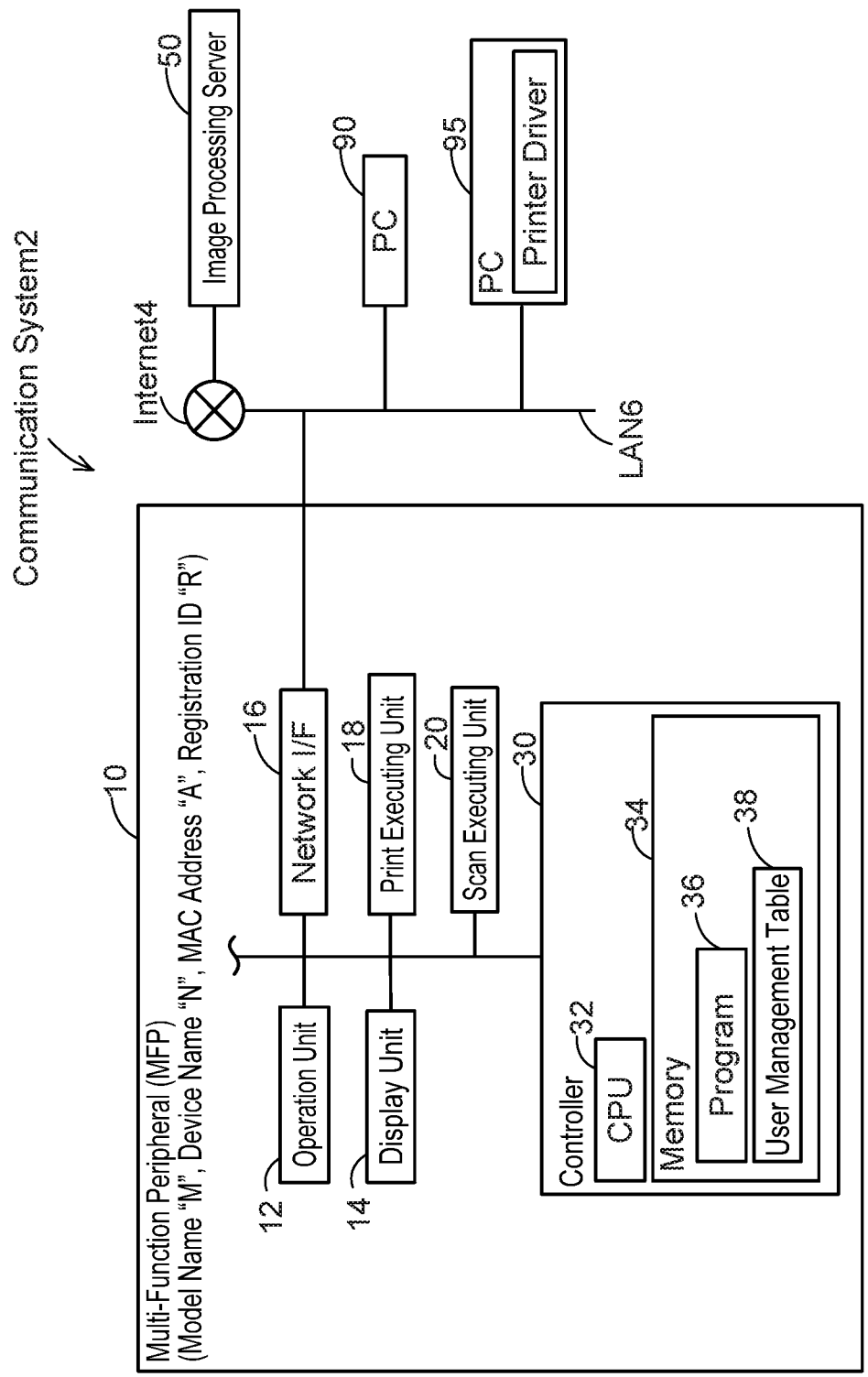
FIG. 2 shows a configuration of a communication system.

Next, a configuration of the communication system 2 will be described with reference to FIG. 2. The communication system 2 comprises the MFP 10, the image processing server 50, and a plurality of PCs 90, 95. The MFP 10 and each of the PCs 90, 95 are connected to the internet 4 via a LAN 6. The server 50 is connected to the Internet 4. Thus, the MFP 10 and each of the PCs 90, 95 can communicate with the server 50 via the Internet 4.

(Configuration of MFP 10)

The MFP 10 is a peripheral device capable of executing plural image processes (that is, it is a peripheral device of the PCs 90 and the like). The plural image processes include color print, monochrome print, color scan, and monochrome scan. The MFP 10 has a model name "M", a device name "N", a MAC address "A", and a registration ID "R". The MFP 10 comprises an operation unit 12, a display unit 14, a network interface 16, a print executing unit 18, a scan executing unit 20, and a controller 30. Each of the units 12 to 30 is connected to a bus line (not shown). Hereinbelow, an interface will be termed "I/F".

The operation unit 12 comprises a plurality of keys. The user can input various instructions to the MFP 10 by operating the operation unit 12. The display unit 14 is a display for displaying various types of information. The network I/F 16 is connected to the LAN 6. The print executing unit 18 comprises a printing mechanism of an inkjet scheme, a laser scheme, or the like. The scan executing unit 20 comprises a scanning mechanism such as CCD and CIS.

The controller 30 comprises a CPU 32 and a memory 34. The CPU 32 executes various processes according to a program 36 stored in the memory 34. The memory 34 is constituted of a volatile memory, a nonvolatile memory, and the like. The memory 34 further stores a user management table 38.

FIG. 3 shows an example of the user management table 38. A left side of FIG. 3 shows the table before the registration process is executed, and a right side thereof shows the table after the registration process has been executed. In the user management table 38, registration state information, login state information, a user ID, a password, account information, a management ID, a token, and image process limitation information are associated with each other for each of one or more users using the MFP 10. Hereinbelow, the user management table 38 may simply be termed "the table 38", and the image process limitation information may simply be termed "limitation information"

The user ID and the password are information for identifying a user, and are used by the user to log in to the MFP 10. For example, an administrator of the MFP 10 stores the user ID and the password for each user in the table 38. The account information is information used by the user in a login operation to the server 50. The management ID is information by which the server 50 identifies the MFP 10 to manage the same, and it is created by the server 50. The management ID differs from the registration ID "R", which was set in advance before shipping of the MFP 10. Further, the token is an access token used for the MFP 10 to execute a communication with the server 50.

The registration state information is information indicating one of "Registered" and "Unregistered", where "Registered" indicates that the MFP 10 has already been registered in the server 50, and "Unregistered" indicates that the MFP 10 is not yet registered in the server 50. The login state information is information indicating one of "Login" and "Logout", where "Login" indicates that the user is logging in the MFP 10, and "Logout" indicates that the user is not logging in the MFP 10.

The limitation information is information that specifies one or more image processes of which use is permitted to the user among the plural image processes that the MFP 10 can execute, which in other words is information that specifies one or more image processes of which use is not permitted to the user. "O" indicates that the use thereof is permitted, and "X" indicates that the use thereof is not permitted. For example, a user identified by a user ID "User1" is permitted to use the monochrome print, however, the user is not permitted to use the color print, the color scan, and the monochrome scan. Further, a user identified by a user ID "User2" is permitted to use all of the image processes. The administrator of the MFP 10 stores the limitation information in the table 38 for each user. The limitation information may include not only the image process(es) of which use is permitted to users, but also may include information related to printer paper size (such as A4) and a number of sheets to be printed that the users are permitted to use.

(Configuration of Image Processing Server 50)

The server 50 is a server installed on the Internet, and may for example be a GCP (abbreviation of Google Cloud Print) provided by Google (registered trademark). However, in a variant, the server 50 may for example be a server provided by a vendor of the MFP 10. The server 50 is a server for intermediating printing between the MFP 10 and the PC 90. That is, the server 50 converts an image file submitted from the PC 90 for example, generates print data including a data format that can be interpreted by the MFP 10, and sends the print data to the MFP 10. Thus, the PC 90 can cause the MFP 10 to execute printing by submitting an image file to the server 50 even if it is not provided with a printer driver for converting the image file to the print data. The users of the MFP 10 register their account information (for example, Google Account) in the serer 50 in advance.

(Configuration of PCs 90, 95)

The PC 90 does not include a print driver for causing the MFP 10 to execute printing, but the PC 95 includes a printer driver. Further, each of the PCs 90, 95 includes a browser program (not shown) such as Google Chrome (registered trademark), for example. Each of the PCs 90, 95 in the present embodiment is a stationary terminal device (such as a desktop PC), however, in a variant, it may be a portable terminal device such as a cell phone (for example, a smartphone), a PDA, a laptop PC, and a tablet PC.

Figure 4:
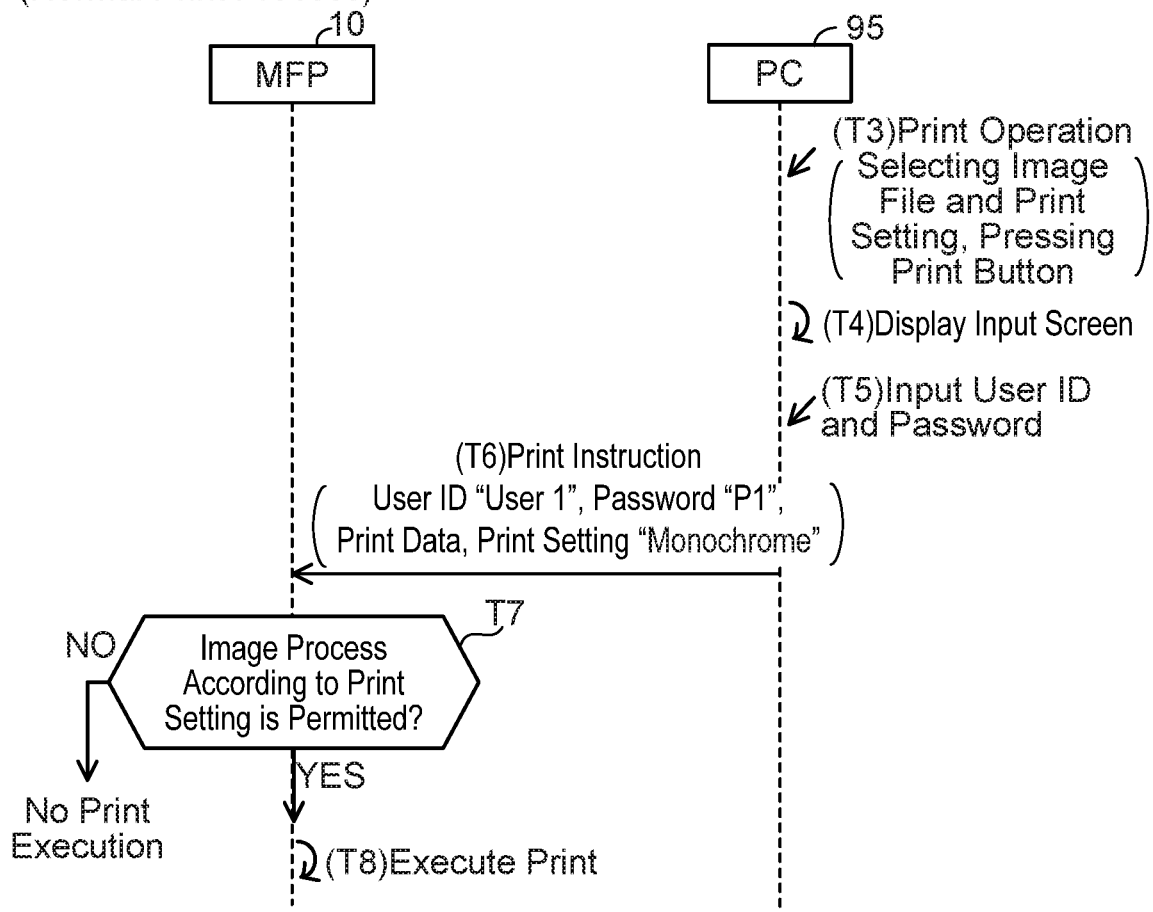
FIG. 4 shows a sequence diagram of a normal print process.

(Normal Print Process: FIG. 4)

Next, a normal print process executed between the MFP 10 and the PC 95 will be described with reference to FIG. 4. The normal print process is a process for causing the MFP 10 to execute printing by the PC 95 sending print data generated by its printer driver to the MFP 10. That is, the normal print process is a process for causing the MFP 10 to execute printing without involving the server 50. Hereinbelow, for the sake of easier understanding, operations executed by the CPU of each device (for example, the CPU 32 of the MFP 10) will be described with the corresponding device (for example, the MFP 10) as the subject, instead of describing the operations with the CPUs as the subject. Further, all of communications executed by the MFP 10 are executed via the network I/F 16. Therefore, the description "via the network I/F 16" will be omitted hereinbelow.

In T3, the user identified by the user ID "User1" (see FIG. 3) (who is hereafter termed "first user") performs a print operation on the PC 95. The print operation includes selecting an image file representing a print target, selecting a print setting (such as the monochrome print or the color print), and pressing a print button. In this case, the PC 95 converts the image file according to the print setting by using its printer driver and generates print data including a data format which can be interpreted by the MFP 10.

In T4, the PC 95 displays an input screen for inputting a user ID and a password. In T5, the PC 95 receives an input of the user ID "User1" and a password "P1" by the first user. Then, in T6, the PC 95 sends a print instruction to the MFP 10. The print instruction includes the user ID "User1" inputted in T5, the password "P1" inputted in T5, the converted print data, and the print setting selected in T3 (which is "monochrome" in the case shown in FIG. 4).

In T6, the MFP 10 receives the print instruction from the PC 95. In T7, the MFP 10 determines whether or not use of the image process according to the print setting included in the print instruction is permitted to the first user. Specifically, the MFP 10 firstly determines whether or not a combination of the user ID "User1" and the password "P1" included in the print instruction is registered in the table 38. In a case where this combination is not registered, the MFP 10 determines NO in T7 and does not execute printing. Further, in a case where this combination is registered, the MFP 10 specifies the limitation information associated with this combination from the table 38. Then, by using the specified limitation information, the MFP 10 determines whether or not the monochrome print, which is the image process according to the print setting "monochrome" included in the print instruction, is permitted. In the present embodiment, since the first user is permitted to use the monochrome print (see FIG. 3), the MFP 10 determines that the use of the monochrome print is permitted (YES in T7), and in T8 the MFP 10 supplies the print data included in the print instruction to the print executing unit 18 and instructs the print setting "monochrome" to the print executing unit 18. Due to this, the monochrome print of the image represented by the print data is executed by the print executing unit 18. On the other hand, in a case where it is determined that the image process according to the print setting included in the print instruction is not permitted (NO in T7), the MFP 10 does not execute printing.

Although not shown, execution of scan may be instructed by the first user to the PC 95, for example. In this case, the MFP 10 receives a scan instruction including the user ID "User1", the password "P1", and a scan setting (for example, the color scan) from the PC 95. Similarly to T7, the MFP 10 determines whether the image process according to the scan setting included in the scan instruction is permitted or not by using the limitation information associated with the user ID "User1" and the password "P1". In a case where this image process is not permitted, the MFP 10 does not execute scan, and in a case where this image process is permitted, the MFP 10 causes the scan executing unit 20 to execute scan. Then, the MFP 10 sends scan data to the PC 95.

As above, in the case where execution of the image process is instructed from the first user without involving the server 50 (T6), the MFP 10 executes the image process of which use is permitted to the first user and does not execute the image process of which use is not permitted to the first user based on the limitation information corresponding to the first user in the table 38. Due to this, only the image process permitted by the administrator can be utilized by the first user.

Figure 5:
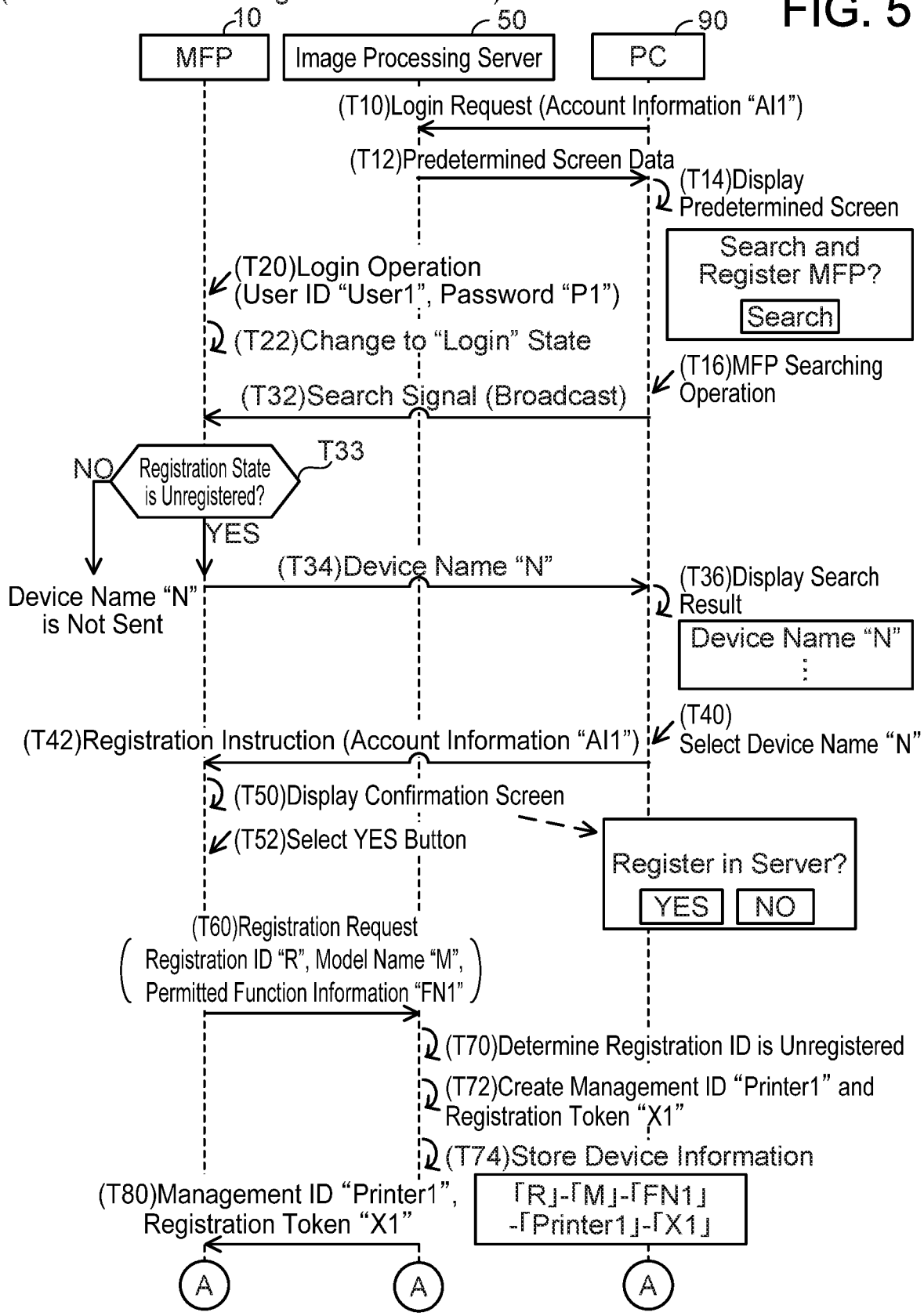
FIG. 5 shows a sequence diagram of a registration process.
Figure 6:
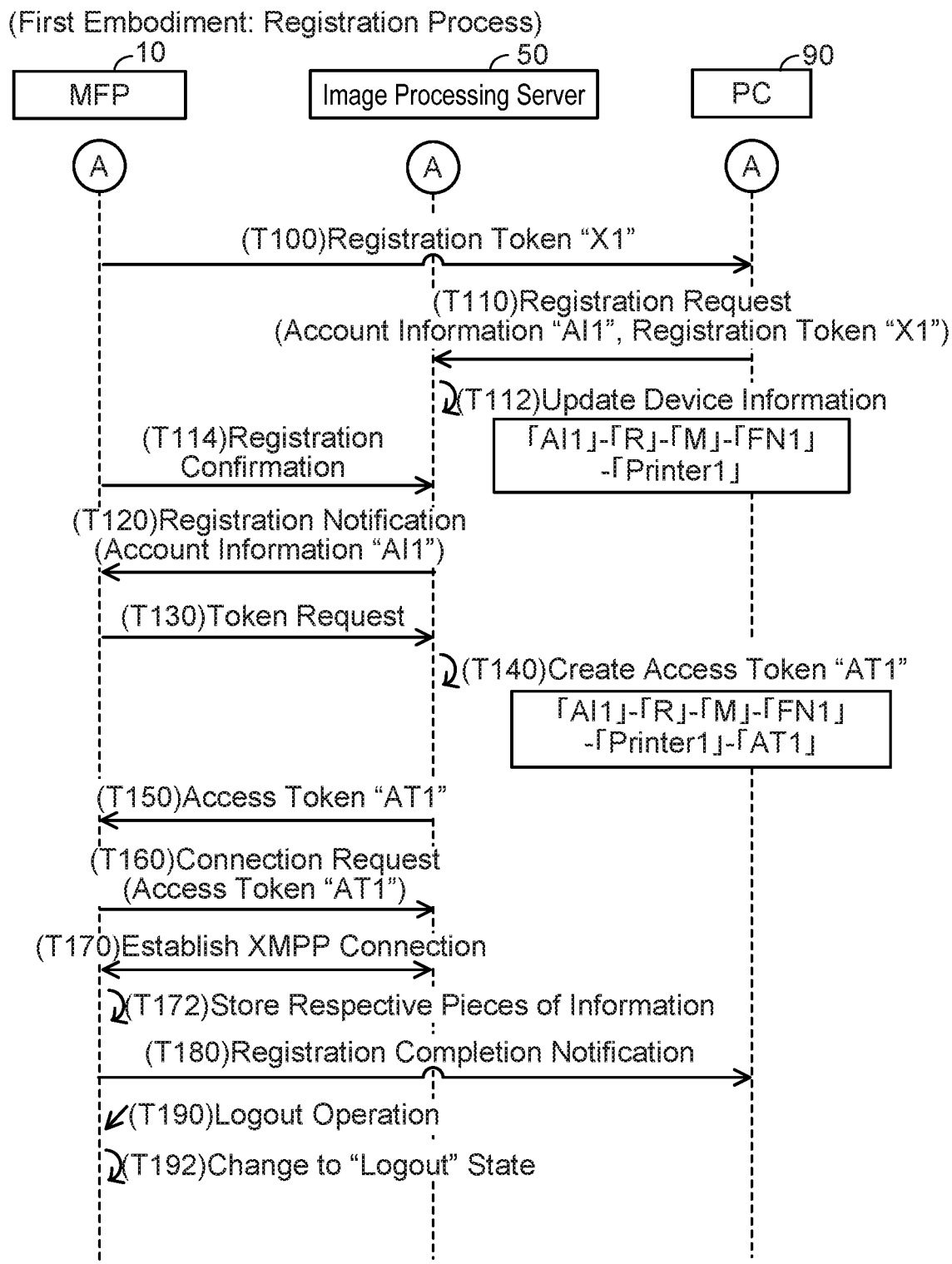
FIG. 6 shows a sequence diagram continued from FIG. 5.

(Registration Process: FIGS. 5 and 6)

Next, the registration process for registering the MFP 10 in the server 50 will be described with reference to FIGS. 5 and 6. Respective below-described processes executed by the PC 90 are executed according to the browser program. Thus, hereinbelow, the description "according to the browser program" will be omitted. In T10, the PC 90 sends a login request including account information "AI1" to the server 50 in response to receiving, from the first user, an input of the account information "AI1" and an instruction to log in to the server 50.

The server 50 receives the login request from the PC 90 in T10, and in a case where the account information "AI1" included in the login request is already registered, it sends predetermined screen data to the PC 90 in T12. This predetermined screen data is screen data representing a predetermined screen including a search button for searching a printer existing near the PC 90.

The PC 90 receives the predetermined screen data from the server 50 in T12, and then displays the predetermined screen represented by the predetermined screen data in T14. Then, in a case where the search button in the predetermined screen is selected by the first user in T16, the PC 90 sends a search signal for searching for a printer to the LAN 6 by broadcast. The search signal is repeatedly sent over a predetermined period of time.

Meanwhile, in T20, the MFP 10 receives a login operation including an input of a user ID "User1" and a password "P1" to the operation unit 12 by the first user. In this case, in 122, the MFP 10 changes login state information associated with the user ID "User1" and the password "P1" in the table 38 from "Logout" to "Login". Due to this, login to the MFP 10 by the first user is completed.

In T32, the MFP 10 receives the search signal from the PC 90. In this case, in T33, the MFP 10 determines whether or not registration state information of the k-th user who is currently logging in the MFP 10 indicates "Unregistered". In a case of determining that the registration state information indicates "Unregistered" (YES in T33), the MFP 10 sends the device name "N" to the PC 90 which is a sender of the search signal in T34. Further, in a case of determining that the registration state information indicates "Registered" (NO in T33), the MFP 10 does not send the device name "N" to the PC 90 and terminates the registration process. As above, the MFP 10 does not send the device name "N", even if the search signal is received from the PC 90 in the state where the user whose registration state information indicates "Registered" is logging in the MFP 10. Due to this, the registration process can be suppressed from being executed plural times for the MFP 10.

In T36, the PC 90 displays a search result including the device name "N" received from the MFP 10. In T40, the PC 90 receives a selection of the device name "N" by the first user. In this case, in T42, the PC 90 sends the MFP 10 a registration instruction including logged-in account information "AI1" by which the server 50 is currently logged in. The registration instruction is a command for instructing a registration in the server 50 to the MFP 10.

When the registration instruction including the account information "AI1" is received from the PC 90 in T42, the MFP 10 displays a confirmation screen on the display unit 14 in T50. The confirmation screen includes a YES button indicating that the MFP 10 is to be registered in the server 50, and a NO button indicating that the MFP 10 is not to be registered in the server 50.

In a case of receiving a selection of the YES button in the confirmation screen from the first user in T52, the MFP 10 sends a registration request to the server 50 in T60. This registration request is a command for requesting the server 50 to register the MFP 10, and it includes the registration ID "R" that is preset in the MFP 10, the model name "M" of the MFP 10, and permitted function information "FN1" of the first user who is currently logging in the MFP 10. The permitted function information "FN1" is information specifying one or more image processes related to printing that the first user is permitted to use (that is, only the monochrome print (see FIG. 3)) among the limitation information of the first user.

When the registration request is received from the MFP 10 in T60, the server 50 determines in T70 whether or not the registration ID "R" included in this registration request is already registered therein. In the present case, the server 50 determines that the registration ID "R" has not yet been registered, and executes process of T72 and its subsequent processes. On the other hand, in a case of determining that the registration ID "R" has already been registered, the server 50 does not execute the process of T72 and its subsequent processes, and terminates the registration process.

In T72, the server 50 creates a management ID "Printer1" and a registration token "X1". The server 50 creates unique management ID "Printer1" and registration token "X1" so that they do not become identical to management IDs and registration tokens that were created in the past. In T74, the server 50 stores device information. The device information is information in which the respective pieces of information included in the registration request of T60 (that is, the registration ID "R", the model name "M", and the permitted function information "FN1"), the created management ID "Printer1", and the created registration token "X1" are associated with each other. Further, in T80, the server 50 sends the management ID "Printer1" and the registration token "X1" to the MFP 10.

In T80, the MFP 10 receives the management ID "Printer1" and the registration token "X1" from the server 50. In this case, in T100 of FIG. 6, the MFP 10 sends the registration token "X1" to the PC 90. In response to receiving the management ID "Printer1" and the registration token "X1" from the server 50 in T80, the MFP 10 periodically sends, to the server 50, a registration confirmation (see T114 to be described later) for checking whether the registration of the account information "AI1" has been completed.

In a case of receiving the registration token "X1" from the MFP 10 in T100, the PC 90 sends a registration request including the account information "AI1" and the registration token "X1" to the server 50 in T110. This registration request is a command for requesting the server 50 to register the account information "AI1".

When the registration request is received from the PC 90 in T110, the server 50 determines in T112 whether or not the registration token "X1" included in the registration request is identical to the registration token "X1" stored in T74. In the present case, the server 50 determines that these registration tokens are identical to each other, and updates the device information. Specifically, the server 50 further stores the account information "AI1" included in the registration request in association with the respective pieces of information that were stored in T74. The registration token "X1" is omitted from the device information shown in T112, since this registration token "X1" is not used in following processes. Further, in T120, the server 50 sends a registration notification including the account information "AI1" to the MFP 10 as a response to the registration confirmation received from the MFP 10. The registration notification is information for notifying the MFP 10 that the registration of the account information "AI1" has been completed.

In a case of receiving the registration notification from the server 50 in T120, the MFP 10 sends a token request to the server 50 in T130. The token request is a command for requesting the server 50 to send an access token.

In a case of receiving the token request from the MFP 10 in T130, the server 50 creates an access token "AT1", which is a unique letter string, in T140. Further, the server 50 further stores the created access token "AT1" in association with the respective pieces of information updated in T112. Then, in T150, the server 50 sends the access token "AT1" to the MFP 10. The server 50 may further create a refresh token for creating a new access token when a valid period of the access token "AT1" expires, and may further send this refresh token to the MFP 10. Generally speaking, information by which the MFP 10 can be authenticated simply needs to be sent.

In a case of receiving the access token "AT1" from the server 50 in T150, the MFP 10 sends a connection request including the access token "AT1" to the server 50 in T160. The connection request is a command for requesting the server 50 to establish an XMPP (abbreviation of Extensible Messaging and Presence Protocol) connection, which is a so-called a full-time connection.

In a case of receiving the connection request from the MFP 10 in T160, the server 50 determines that the access token "AT1" included in the connection request is registered as the device information (see T140), and establishes the XMPP connection in T170. When the XMPP connection is established as above, the server 50 can send signals (such as a job notification in T290 of FIG. 7 to be described later) to the MFP 10 over a firewall of the IAN 6 by using the XMPP connection.

In T172, the MFP 10 stores the respective pieces of information in the table 38. Specifically, the account information "AI1" received in T42 of FIG. 5 (or in T120 of FIG. 6), the management ID "Printer1" received in T80, and the access token "AT1" received in T150 of FIG. 6 are stored in association with the user ID "User1" which is logging in the MFP 10 (see T20 of FIG. 5). The MFP 10 further changes the registration state information associated with the user ID "User1" from "Unregistered" to "Registered".

In T180, the MFP 10 sends a registration completion notification to the PC 90. The registration completion notification is information indicating that the registration of the MFP 10 in the server 50 has been completed. In T190, the MFP 10 receives a logout operation in the operation unit 12 by the first user. In this case, in T192, the MFP 10 changes the login state information associated with the user ID "User1" from "Login" to "Logout". When the process of T192 ends, the registration process is terminated.

When the registration process as above is executed, the device information of the MFP 10 is registered in the server 50 (T140), and the respective pieces of information are stored in the MFP 10 in association with the user ID "User1" as shown in the right side of the table 38 of FIG. 3. After the above registration process has been executed according to the instruction from the first user, whose registration state is "Unregistered, there is a possibility that a second user, who is identified by a user ID "User2" might attempt to execute the above registration process, for example. In such a case, in T10, T20, and T42 of FIG. 5, account information "AI2", the user ID "User2", and a password "P2" would be used. As such, a registration request in T60 would include the registration ID "R", the model name "M", and permitted function information "FN2". The permitted function information "FN2" is information specifying one or more image processes related to printing that the second user is permitted to use (that is, the monochrome print and the color print (see FIG. 3)) among limitation information of the second user. In this case, the server 50 determines in T70 that the registration ID "R" included in this registration request is already registered. As a result, the server 50 does not execute the process of T72 and its subsequent processes, and sends a notification indicating that the MFP 10 is already registered to the MFP 10. Due to this, additional registration of the device information of the MFP 10 is not executed in the serve 50, and the respective pieces of information are not stored in the MFP 10 in association with the user ID "User2".

Figure 7:
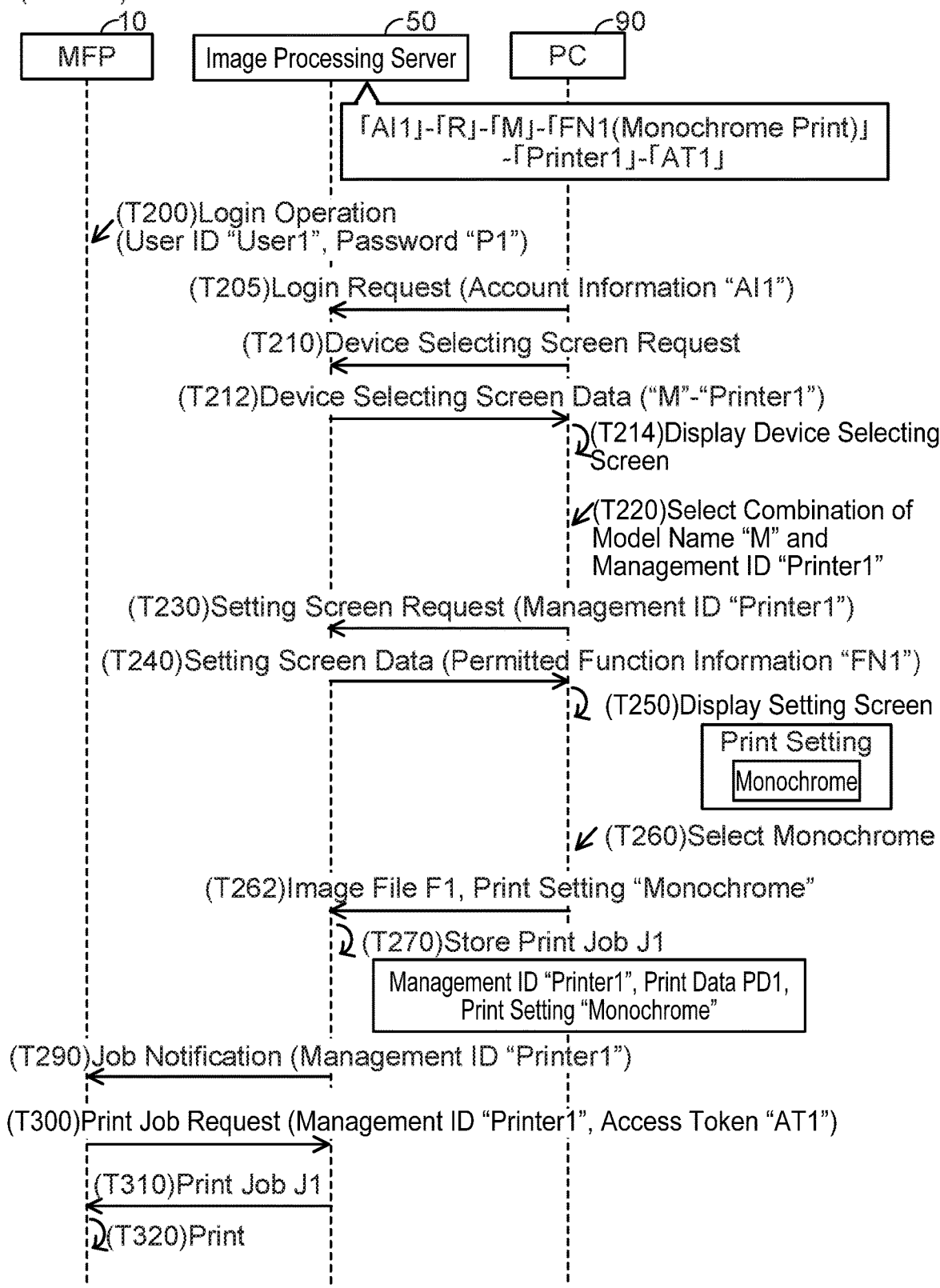
FIG. 7 shows a sequence diagram of a case A of a server print process.

(Server Print Process of Case A: FIG. 7)

Figure 8:
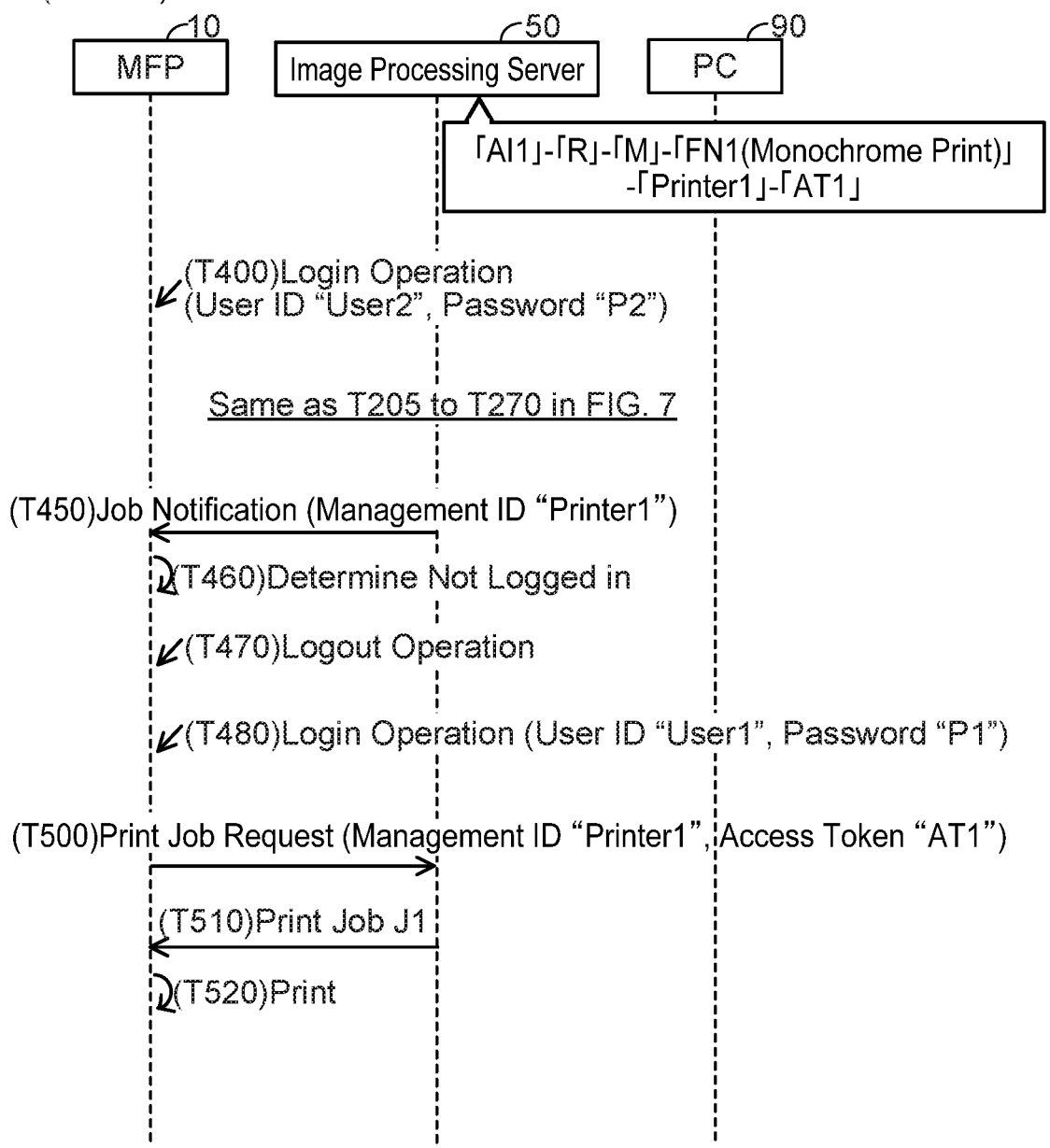
FIG. 8 shows a sequence diagram of a case B of the server print process.

Next, a server print process that causes the MFP 10 to execute printing using the server 50 will be described with reference to FIGS. 7 and 8. Processes of FIGS. 7 and 8 are executed after the first user has executed the aforementioned registration process and the MFP 10 has been registered in the server 50. Thus, the server 50 already has the device information including the permitted function information "FN1" of the first user registered therein. Firstly, a case A where the first user causes the MFP 10 to execute printing from the PC 90 will be described with reference to FIG. 7.

In T200, the MFP 10 receives a login operation including an input of the user ID "User1" and the password "P1" from the first user. In this case, the MFP 10 changes the login state information associated with the user ID "User1" from "Logout" to "Login".

In response to receiving an input of the account information "AI1" from the first user, the PC 90 sends a login request including the account information "AI1" to the server 50 in T205, and in I210, it sends a device selecting screen request to the server 50. This request is a command for requesting the server 50 to send data representing a screen for selecting a device associated with the account information "AI1".

In a case of receiving the device selecting screen request from the PC 90 in 1210, the server 50 specifies the device information including the account information "AI1" and sends device selecting screen data that indicates the model name "M" and the management ID "Printer1" included in the specified device information to the PC 90 in T212. In a case where the first user has registered another MFP, which is different from the MFP 10, in the server 50, the device selecting screen data further includes a model name and a management ID of this other MFP.

In a case of receiving the device selecting screen data from the server 50 in 1212, the PC 90 displays a device selecting screen represented by this screen data in T214. In a case of receiving a selection of a combination of the model name "M" and the management ID "Printer1" in the device selecting screen from the first user in T220, the PC 90 sends a setting screen request including the management ID "Printer1" to the server 50 in T230. This request is a command for requesting the server 50 to send data representing a screen for selecting the print setting.

In a case of receiving the setting screen request from the PC 90 in T230, the server 50 specifies the permitted function information "FN1" associated with the management ID "Printer1" included in the setting screen request. The server 50 generates setting screen data representing a setting screen that allows a selection of the image process permitted in the permitted function information "FN1" (that is, the monochrome print), which is in other words a setting screen that prohibits a selection of image process(es) that are not permitted in the permitted function information "FN1" (that is, the color print). Then, the server 50 sends the generated setting screen data to the PC 90 in T240.

In a case of receiving the setting screen data in T240, the PC 90 displays a setting screen represented by the setting screen data in T250. This setting screen includes a button indicating the monochrome print, but does not include a button indicating the color print. In T260, the PC 90 receives a selection of the button indicating the monochrome print in the setting screen from the first user, and then receives a selection of an image file F1 representing a print target image. Then, in T262, the PC 90 sends the image file F1 and the print setting "monochrome" indicating the monochrome print to the server 50.

In a case of receiving the image file F1 and the print setting "monochrome" from the PC 90 in T262, the server 50 converts the image file F1 according to the print setting "monochrome" and generates print data PD1 in T270. Then, the server 50 stores a print job J1 including the management ID "Printer1" received in T230, the generated print data PD1, and the print setting "monochrome" received in T262. Then, in 1290, the server 50 sends a job notification including the management ID "Printer1" to the MFP 10 by using the XMPP connection (see T170 of FIG. 6). The job notification is information for notifying the MFP 10 that the print job J1 has been stored.

In a case of receiving the job notification from the server 50 in T290, the MFP 10 determines that the login state information associated with the management ID "Printer1" included in this job notification is "Login" in the table 38 (see T200). In this case, in T300, the MFP 10 sends a print job request to the server 50. The print job request is a command for requesting the server 50 to send the print job J1, and includes the management ID "Printer1" and the access token "AT1" associated with the management ID "Printer1" in the table 38.

In a case of receiving the print job request from the MFP 10 in T300, the server 50 specifies the device information including the management ID "Printer1" in the print job request, and specifies the access token "AT1" in the specified device information. Then, the server 50 determines whether or not the specified access token "AT1" is identical to the access token "AT1" in the print job request. In the present case, since these access tokens are identical to each other, the server 50 sends the print job J1 including the management ID "Printer1" to the MFP 10 in T310. In a case where the access tokens are not identical to each other, the server 50 does not send the print job J1 to the MFP 10.

In a case of receiving the print job J1 from the server 50 in T310, the MFP 10 executes printing according to the print job J1 in T320. Specifically, the MFP 10 supplies the print data PD1 in the print job J1 to the prim executing unit 18, and instructs the print setting "monochrome" to the print executing unit 18. Due to this, the monochrome printing of the image represented by the print data is executed by the print executing unit 18. When the process of T320 ends, the server print process for the case A of FIG. 7 is terminated.

Here, a comparative example in which the MFP 10 periodically sends the print job request including the management ID "Printer1" and the access token "AT1" to the server 50 in response to the first user logging in T200 will be considered. In this case, in a case where the server 50 receives the print job request from the MFP 10 after having stored the print job J1 including the management ID "Printer1", it sends the print job J1 to the MFP 10. Since the server 50 can send the print job J1 to the MFP 10 as a response to the print job request, the job notification does not need to be sent to the MFP 10 using the XMPP connection. However, in the configuration of the comparative example, the print job request is periodically sent from the MFP 10 to the server 50 during a period of time from when the first user logs in to the MFP 10 until when the print job J1 is stored in the server 50 (that is, during a period between T200 to T270), and thus, a communication load between the MFP 10 and the server 50 is large. Contrary to this, in the present embodiment, the MFP 10 sends the print job request to the server 50 (T300) in response to receiving the job notification from the server 50 (T290), and thus the print job request does not have to be sent periodically. As a result, the communication load between the MFP 10 and the server 50 can be reduced. In a variant, the configuration of the above comparative example may be employed. That is, in T170 of FIG. 6, the XMPP connection does not have to be established.

(Server Print Process of Case B: FIG. 8)

Next, a case B will be described with reference to FIG. 8. In T400, the MFP 10 receives the login operation including an input of the user ID "User2" and the password "P2" from the second user. In this case, the MFP 10 changes the login state information associated with the user ID "User2" from "Logout" to "Login".

Meanwhile, the server 50 and the PC 90 execute processes same as T205 to T270 of FIG. 7 in accordance with instructions from the first user. As a result, the server 50 stores the print job J1. Then, in T450, the server 50 uses the XMPP connection (see T170 of FIG. 6) to send the job notification including the management ID "Printer1" to the MFP 10.

In a case of receiving the job notification from the server 50, the MFP 10 determines in T460 that the login state information associated with the management ID "Printer1" included in this job notification is "Logout" in the table 38. In this case, the MFP 10 does not send a print job request to the MFP 10.

After this, in T470, the MFP 10 receives the logout operation from the second user. In this case, the MFP 10 changes the login state information associated with the user ID "User2" from "Login" to "Logout". Thereafter in T480, the MFP 10 receives the login operation including an input of the user ID "User)" and the password "P1" from the first user, and changes the login state information associated with the user ID "User1" from "Logout" to "Login". In this case, the MFP 10 sends a print job request to the server 50 in T500. The process of T500 and its subsequent processes of T510 and T520 are same as T300 to T320 of FIG. 7. When the process of T520 ends, the server print process for the case B is terminated.

In the case B, the MFP 10 does not send the print job request to the server 50 and does not cause the MFP 10 to execute printing in the case where the login state information associated with the management ID "Printer1" in the table 38 is "Logout" (T460). Due to this, a printed medium that was printed according to the print job can be suppressed from being taken away by the second user, who is different from the first user who had registered the print job in the server 50. Further, in the case where the first user logs in to the MFP 10 (T480) after the second user has logged out from the MFP 10, the MFP 10 causes the MFP 10 to execute printing by sending the print job request to the server 50. Due to this, the printed medium can suitably be provided to the first user who registered the print job in the server 50.

Figure 9:
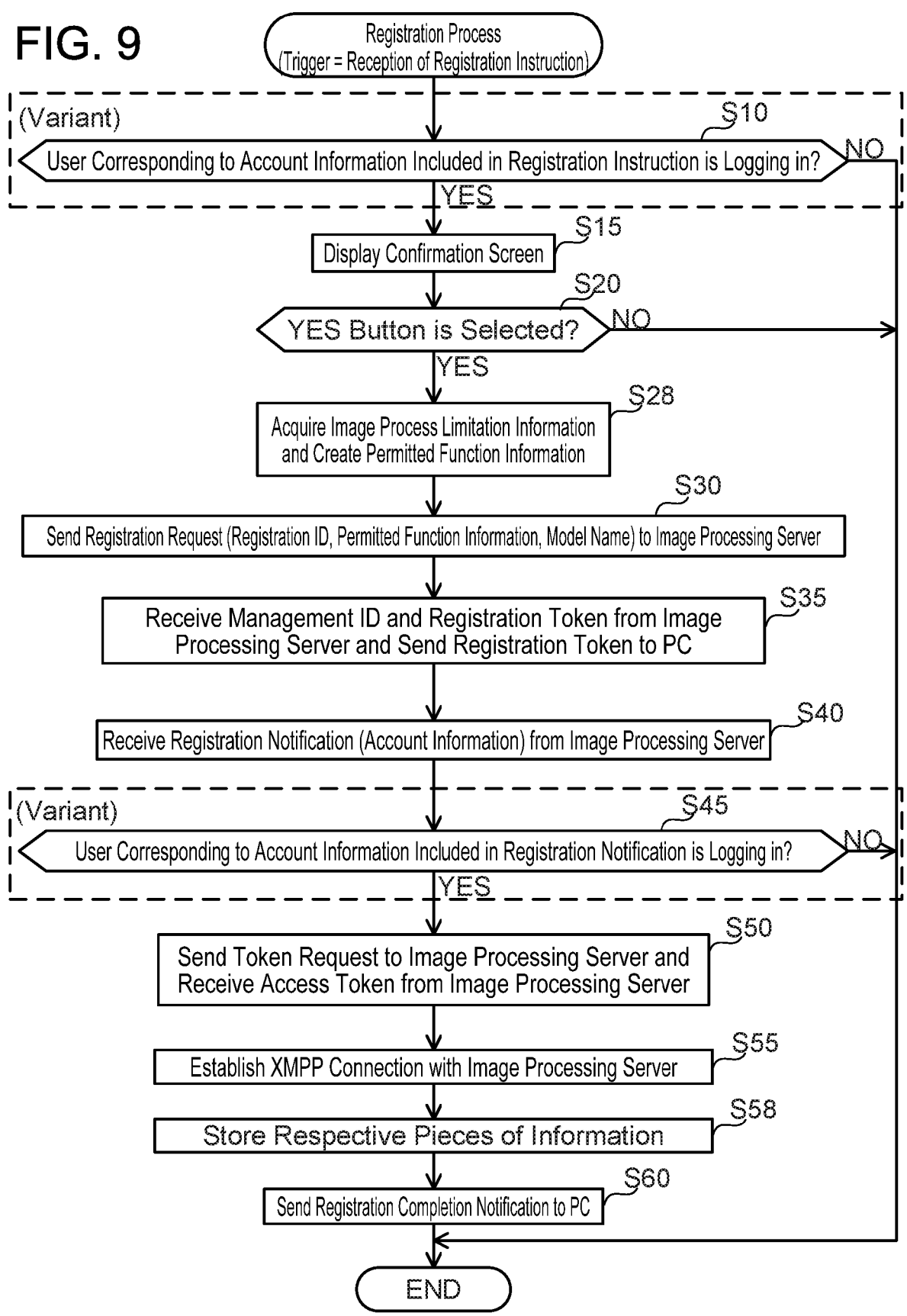
FIG. 9 shows a flow chart of the registration process.

(Registration Process of MFP 10: FIG. 9)

Next, a process executed by the CPU 32 of the MFP 10 for realizing the registration process of FIGS. 5 and 6 will be described with reference to FIG. 9. The CPU 32 executes the process of FIG. 9 in response to receiving the registration instruction including the logged-in account information from the PC 90 (see T42 of FIG. 5). S10 and S45 enclosed with broken lines in FIG. 9 are not executed in this embodiment, but are executed in a variant to be described later.

In S15, the CPU 32 causes the display unit 14 to display the confirmation screen for checking with the user as to the registration of the MFP 10 in the server 50 (T50 of FIG. 5). In S20, the CPU 32 monitors whether the YES button included in the confirmation screen is selected by the user. In the case where the YES button is selected by the user (T52), the CPU 32 determines YES in S20 and proceeds to S28. On the other hand, in a case where the NO button is selected by the user, the CPU 32 determines NO in S20 and terminates the process of FIG. 9. In a variant, in a case of receiving the registration instruction from the PC 90, the CPU 32 may execute the process of S28 without executing the processes of S15 and S20.

In S28, the CPU 32 acquires the limitation information associated with the login state information "Login" in the table 38, and creates the permitted function information indicating the image process(es) (such as the monochrome print) related to printing permitted in the acquired limitation information. In S30, the CPU 32 sends the server 50 the registration request including the registration ID "R" preset in the MFP 10, the permitted function information specified in S28, and the model name "M" (T60).

In S35, the CPU 32 receives the management ID and the registration token from the server 50 (T80), and sends this registration token to the PC 90 (T100 of FIG. 6). Further, the CPU 32 starts to periodically send the confirmation request to the server 50. In S40, the CPU 32 receives the registration notification including the logged-in account information from the server 50 (T120). In S50, the CPU 32 sends the token request to the server 50 (T130), and receives the access token from the server 50 (T150). Then, in S55, the CPU 32 establishes the XMPP connection with the server 50 (T170) by using the received access token.

In S58, the CPU 32 stores the respective pieces of information in the memory 34 in association with the login state information "Login" (T172). Specifically, the CPU 32 stores the management ID received in S35, the account information included in the registration instruction (that is, the account information received in S40) which is the trigger of the process of FIG. 9, the access token received in S50, and the registration state information "Registered". In S60, the CPU 32 sends the registration completion notification to the PC 90 (T180). When S60 ends, the process of FIG. 9 is terminated.

Figure 10:
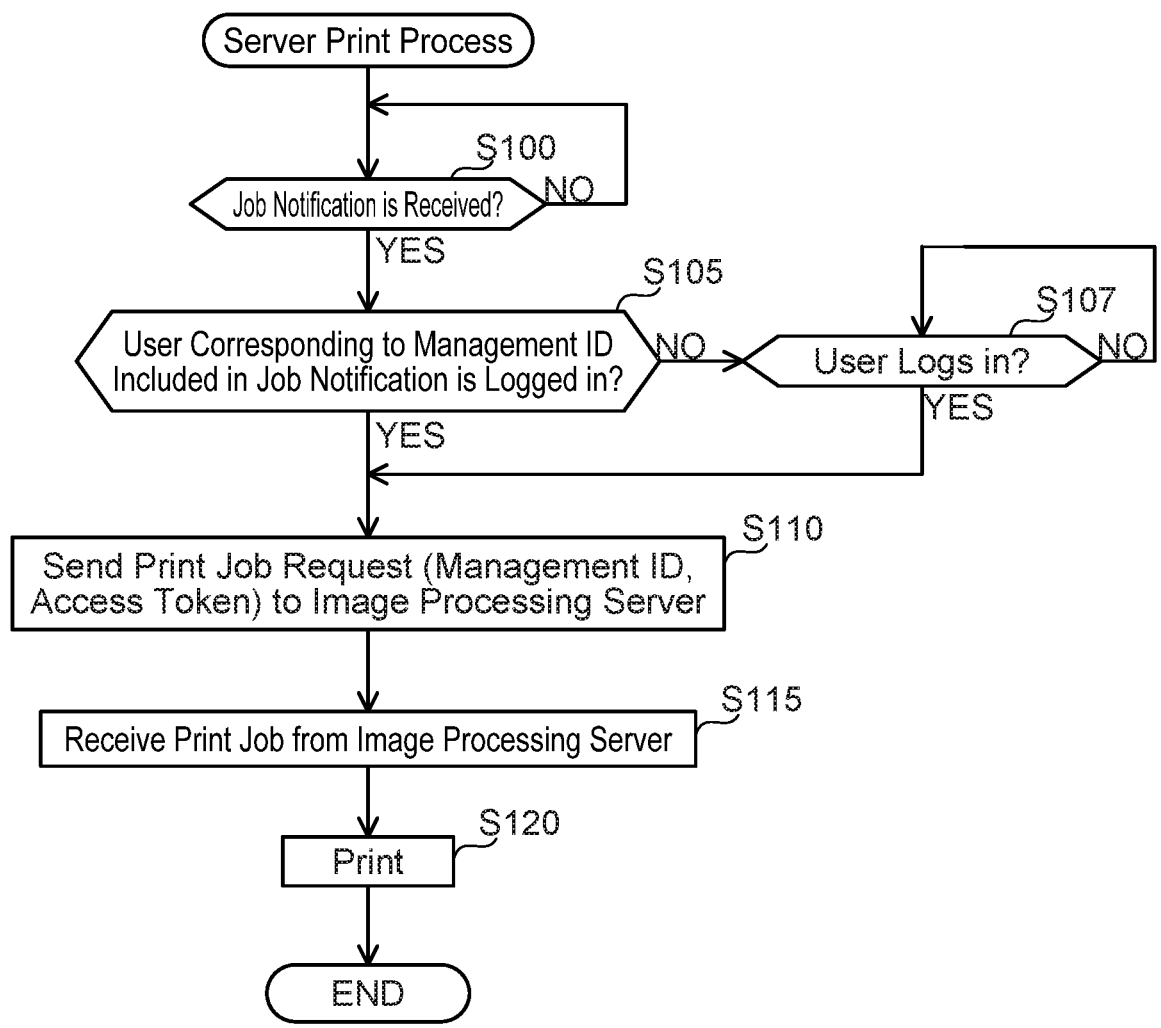
FIG. 10 shows a flow chart of the server print process.

(Server Print Process of MFP 10: FIG. 10)

Next, a process executed by the CPU 32 of the MFP 10 for realizing the server print process of FIGS. 7 and 8 will be described with reference to FIG. 10. The CPU 32 starts the process of FIG. 10 with a power of the MFP 10 being turned on as the trigger.

In S100, the CPU 32 monitors whether the job notification is received from the server 50. In the case of receiving the job notification (YES in S100, T290 of FIG. 7, and T450, T490 of FIG. 8), the CPU 32 proceeds to S105.

In S105, the CPU 32 determines whether or not the user corresponding to the management ID included in the received job notification (hereinbelow termed "corresponding user") is logging in. Specifically, the CPU 32 firstly determines whether or not the login state information "Login" exists in the table 38. In a case where the login state information "Login" does not exist, the CPU 32 determines that the corresponding user is not logging in (NO in S105), and proceeds to S107. In a case where the login state information "Login" exists, the CPU 32 determines whether or not the management ID associated with the login state information "Login" is identical to the management ID included in the job notification. In the case where the two management IDs are identical to each other, the CPU 32 determines that the corresponding user is logging in (YES in S105) and proceeds to S110, whereas in the case where the two management IDs are not identical to each other, the CPU 32 determines that the corresponding user is not logging in (NO in S105, T460 of FIG. 8), and proceeds to S107. As above, in the case where the two management IDs are not identical to each other, the print process of S110 and its subsequent processes are not executed. Due to this, a third party different from the corresponding user can be prevented from taking away a print medium printed according to the instruction from the corresponding user.

In S107, the CPU 32 monitors whether the corresponding user logs in. In the case of receiving the input of the user ID and the password associated with the management ID included in the job notification received in S100 (T480 of FIG. 8), the CPU 32 determines that the corresponding user logs in (YES in S107), and proceeds to S110.

In S110, the CPU 32 sends the print job request including the management ID included in the job notification received in S100 and the access token associated with this management ID in the table 38 to the server 50 (T300 of FIG. 7, T500 of FIG. 8). In S115, the CPU 32 receives the print job from the server 50 (T310 of FIG. 7, T510 of FIG. 8). Then, in S120, the CPU 32 causes the print executing unit 18 to execute printing according to the print data included in the received print job (T320 of FIG. 7, T520 of FIG. 8). When the process of S120 ends, the process of FIG. 10 is terminated.

Effects of Embodiment

For example, a configuration of a comparative example will be assumed, in which a registration request including permitted function information indicating all the image processes related to printing that the MFP 10 is capable of executing (that is, both the color print and the monochrome print) is sent to the server 50 in T60 of FIG. 5, instead of sending the registration request including the permitted function information "FN1" corresponding to the first user who is logging in the MFP 10. In this case, the permitted function information indicating both the color print and the monochrome print is registered in the server 50 in T74. As a result, a setting screen including buttons respectively indicating the color print and the monochrome print is displayed in T250 of FIG. 7, and thus the color print could be selected by the first user. Accordingly, the print job J1 including the print setting indicating the color print may be sent to the MFP 10 in T310, and thus the color print may be executed despite the first user not being permitted to use the color print. To suppress such an event from occurring, in the present embodiment, in the case of receiving the registration instruction including the account information "AI1" from the PC 90 (ST42 of FIG. 5), the MFP10 sends the server 50 the registration request including the permitted function information "FN1" obtained by using the limitation information corresponding to the first user (T60). As a result, the permitted function information "FN1" is registered in the server 50 (T74). Accordingly, the setting screen including only the button indicating the monochrome print is displayed in T250 of FIG. 7. Due to this, the color print will never be selected by the first user, and the monochrome print is selected (T260). As a result, the execution of the monochrome print, of which use is permitted to the first user, among the one or more image processes specified by the registered permitted function information "FN1" is instructed by the first user to the server 50 via the PC 90 (T262). Due to this, the MFP 10 receives the print job J1 including the print setting "monochrome" of which use is permitted to the first user from the server 50, and executes the monochrome print (T310, T320). Since the MFP 10 does not receive the execution request for requesting the execution of the color print, of which use is not permitted to the first user, from the server 50, the color print of which use is not permitted to the first user can be suppressed from being executed by the MFP 10.

(Corresponding Relationships)

The MFP10, the image processing server 50, and the PC 90 are an example of "image processing device", "server", and "terminal device", respectively. The monochrome print executed in T8 of FIG. 4 and the monochrome print executed in T320 of FIG. 7 and T520 of FIG. 8 are an example of "first image process" and "second image process", respectively. The image process limitation information and the permitted function information "FN1" of the first user are an example of "first process specifying information" and "second process specifying information", respectively. The user ID and the password are examples of "user information", and the registration state information "Registered" and the management ID are examples of "completion information". The state in which the first user is logging in, and the state in which the second user is logging in are an example of "first login state" and "second login state", respectively.

The process of T8 of FIG. 4 and the process of S120 of FIG. 10 are an example of "cause the image process executing unit to execute a first image process among the plurality of image processes" and "cause the image process executing unit to execute the second image process", respectively. The process of T42 of FIG. 5 is an example of "receive an input of a registration instruction for the target user who is to use the image processing device via the server". The process of S28 and the process of S30 of FIG. 9 are an example of "acquire first process specifying information" and "send, to the server, a registration request", respectively. The process of S115 of FIG. 10 is an example of "receive an execution request of a second image process from the server". The process of T20 of FIG. 5 is an example of "receive an input of target user information". The process of S58 of FIG. 9 is an example of "store completion information in association with target user information in the memory after the registration request has been sent to the server". The process of S105 of FIG. 10 is an example of "determine whether a state of the image processing device is a first login state using the target user information associated with the completion information in the memory, in a case where the execution request is received from the server".

Figure 12:
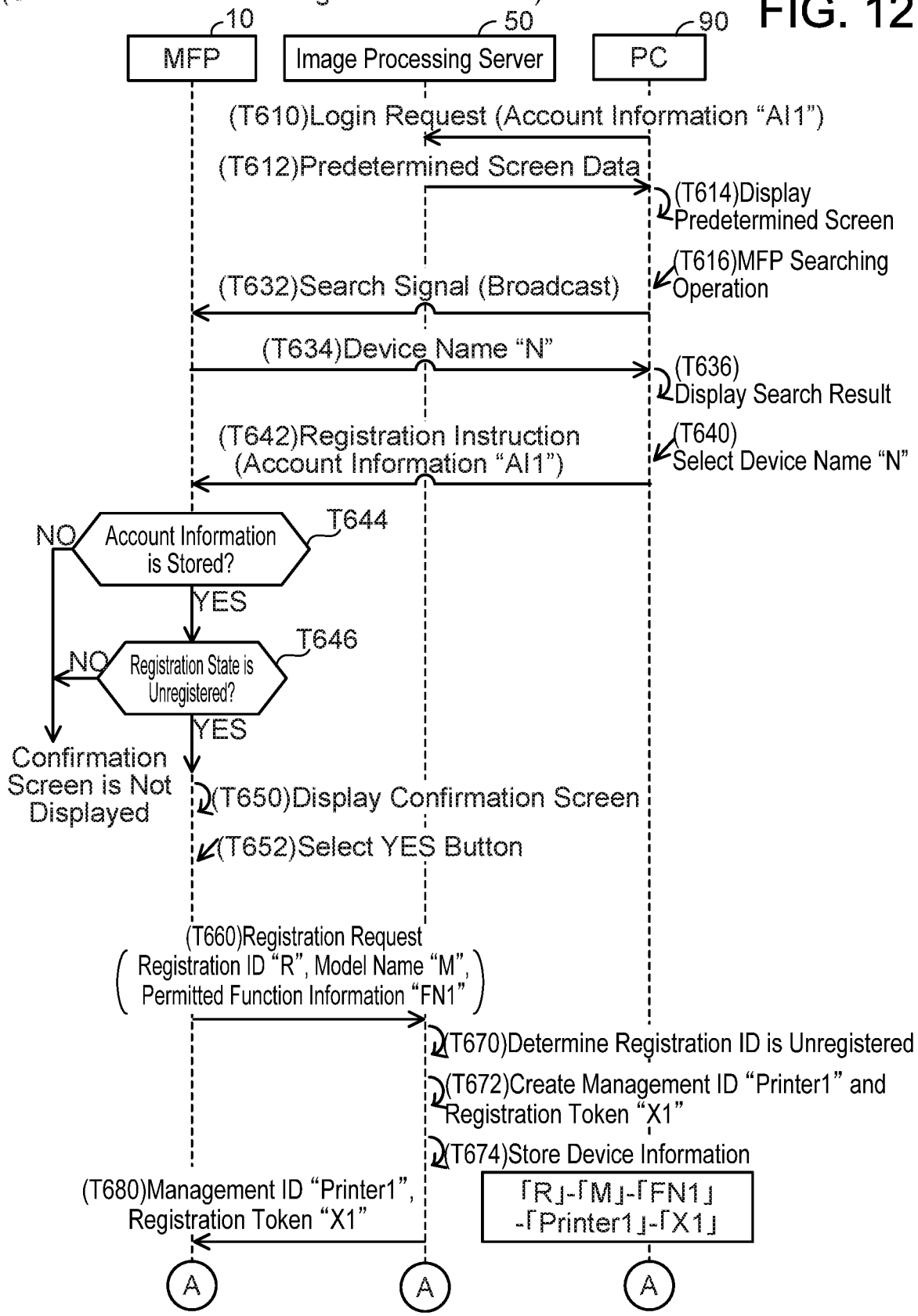
FIG. 12 shows a sequence diagram of a registration process of the second embodiment.

Second Embodiment: FIGS. 11 and 12

Next, a second embodiment will be described with reference to FIGS. 11 and 12. The second embodiment, as shown in FIG. 11, differs from the first embodiment in that the administrator of the MFP 10 stores the account information of the respective users in the table 38 in advance. Further, a registration process of FIG. 12 is executed instead of the registration process of FIG. 5.

T610 to T642 of FIG. 12 are the same as T10 to T42 of FIG. 5. However, in the present embodiment, processes corresponding to T20, T22, and T33 of FIG. 5 are not executed. That is, in the present embodiment, the MFP 10 receives the registration instruction including the logged-in account information "AI1" by which the server 50 is currently logged in from the PC 90 in T642 in a state where the first user is not logging in the MFP 10.

In T644, the MFP 10 determines whether or not the logged-in account information "AI1" included in the received registration instruction is stored in the table 38. In a case of determining that the logged-in account information "AI1" is stored in the table 38 (YES in T644), the MFP 10 proceeds to T646. On the other hand, in a case of determining that the logged-in account information "AI1" is not stored in the table 38 (NO in T644), the MFP 10 displays a screen indicating that use of the MFP 10 is not permitted on the display unit 14, and terminates the registration process. Due to this, since the registration request is not sent to the server 50, the registration process can be prevented from being executed for a user whose account information is not stored in the table 38, that is, for a user who is not permitted to use the MFP 10.

In T646, the MFP 10 determines whether or not the registration state information associated with the logged-in account information "AI1" in the table 38 indicates "Unregistered". In a case of determining that the registration state information indicates "Unregistered" (YES in T646), the MFP 10 displays the confirmation screen on the display unit 14 in T650. On the other hand, in a case of determining that the registration state information indicates "Registered" (NO in T646), the MFP 10 does not display the confirmation screen on the display unit 14, and terminates the registration process. Due to this, the registration process can be prevented from being executed plural times by the same user.

T652 to T680 are the same as T52 to T80 of FIG. 5. When the process of T680 ends, the process of FIG. 12 is terminated, and then the process of T100 of FIG. 6 and its subsequent processes are executed. As a result, the registration of the MFP 10 in the server 50 is completed.

According to the present embodiment, the user does not have to log in to the MFP 10 in the registration process (that is, T20 of FIG. 5 is not necessary). In the present embodiment, the account information "AI1" is an example of "target account information".

Variant of First and Second Embodiments: FIG. 9

A variant of the first and second embodiments will be described with reference to FIG. 9. In this variant, the administrator of the MFP 10 stores the account information of the respective users in the table 38 in advance, similarly to the second embodiment. Further, similarly to the first embodiment, the users log in to the MFP 10 before executing the registration process (T20 of FIG. 5).

In S10, the CPU 32 determines whether or not the user corresponding to the account information included in the registration instruction received from the PC 90 is logging in the MFP 10. Specifically, the CPU 32 firstly determines whether or not the login state information "Login" exists in the table 38. In a case where the login state information "Login" does not exist, the CPU 32 determines that the user is not logging in (NO in S10), skips the process of S15 and its subsequent processes, and terminates the process of FIG. 9. In a case where the login state information "Login" exists, the CPU 32 determines whether or not the account information associated with the login state information "Login" in the table 38 is identical to the account information included in the registration instruction. In a case of determining that these two pieces of account information are identical to each other (YES in S10), the CPU 32 proceeds to S15, whereas in a case of determining that these two pieces of account information are not identical to each other (NO in S10), the process of FIG. 9 is terminated without executing S15 and its subsequent processes. S15 to S40 are the same as in the first embodiment.

In S45, the CPU 32 determines whether or not the user corresponding to the account information included in the registration notification received in S40 is logging in the MFP 10. Specifically, the CPU 32 determines whether the account information associated with the login state information "Login" in the table 38 is identical to the account information included in the registration notification or not. In a case of determining that these two pieces of account information are identical to each other (YES in S45), the CPU 32 proceeds to S50, whereas in a case of determining that these two pieces of account information are not identical to each other (NO in S45), the process of FIG. 9 is terminated without executing S50 and its subsequent processes. S50 to S60 are the same as in the first embodiment.

For example, a situation will be assumed in which the first use is logging in the server 50 and the second user is logging in the MFP 10. In this case, if the processes of S10 and S45 are not executed, for example, the information for the second user may be registered in the server 50 in association with the account information "AI1" of the first user (see T112 of FIG. 6), and the information for using the server 50 may be stored in the table 38 in association with the user ID "User2" of the second user (S58) despite the second user not being logging in the server 50. In this variant, in the case of determining NO in S10, the registration request is not sent to the server 50 (that is, S30 and S35 are not executed), and thus information for a certain user can be suppressed from being registered in the server 50 in association with account information of another user. Further, in the case of determining NO in S45, the token request is not sent to the server 50 (that is, S50 to S58 are not executed), and thus the information for the other user is suppressed from being stored in the table 38 in association with the user ID of the certain user, despite the other user not being logging in the server 50.

In the present variant, the user ID "User1" inputted in 120, the account information "AI1" associated with this user ID "User1", and the account information "AI1" included in the registration instruction of T42 are an example of "target user information", "target account information", and "logged-in account information", respectively. The process of S10 of FIG. 9 is an example of "determine whether target account information associated with the target user information in the memory is identical to the logged-in account information included in the registration instruction, in the case where the input of the registration instruction is received while the state of the image processing device is the login state using the target user information".

Third Embodiment: FIG. 13

Next, a third embodiment will be described with reference to FIG. 13. In this embodiment, the MFP 10 is provided with a so-called WEB server function, and is capable of receiving instructions to the server from an external device such as a PC. Further, a registration process of FIG. 13 is executed instead of the registration process of FIGS. 5 and 6.

In the registration process of the present embodiment, the first user does not log in to the server 50 (that is, T10 of FIG. 5 is not executed). In T700 of FIG. 13, the PC 90 sends a login instruction including the user ID "User1" and the password "P1" to the MFP 10, in a case of receiving, from the first user, an instruction for accessing the WEB server of the MFP 10 to log in.

In a case of receiving the login instruction from the PC 90 in T700, the MFP 10 changes the login state information associated with the user ID "User1" in the table 38 from "Logout" to "Login" in T710. Then, in T712, the MFP 10 sends predetermined screen data representing a predetermined screen including a registration button to the PC 90.

In a case of receiving the predetermined screen data from the MFP 10 in T712, the PC 90 displays the predetermined screen represented by the predetermined screen data in T714. Then, in a case where the registration button in the predetermined screen is selected by the first user in T716, the PC 90 sends a registration instruction to the MFP 10 in T718. This registration instruction does not include the account information "AI1" of the first user.

T1720 to T730 are the same as T50 to T60 of FIG. 5, and after T720 to T730, processes same as T70 to T74 of FIG. 5 are executed. Then, in T740, the server 50 sends the management ID "Printer1" and a URL (abbreviation of Uniform Resource Locator) "U1" to the MFP 10. The URL "U1" is location information indicating a location within the server 50, and includes a registration token "X1" as a query.

In a case of receiving the management ID "Printer1" and the URL "U1" from the server 50 in T740, the MFP 10 sends the URL "U1" to the PC 90 in T750.

In a case of receiving the URL "U1" from the MFP 10 in T750, the PC 90 sends the URL "U1" to the server 50 and accesses the server 50 in T760.

In a case of receiving the URL "U" from the PC 90 in 760, the server 50 determines whether or not the registration token "X1" included in the URL "U1" is identical to the registration token "X1" included in the device information stored in T74. In the present case, since these registration tokens are identical to each other, the server 50 sends input screen data representing an input screen for inputting account information to the PC 90 in T762.

In a case of receiving the input screen data from the server 50 in T762, the PC 90 displays the input screen in T764. Then, in a case where the account information "AI1" is inputted to the input screen by the first user in T770, the PC 90 sends a registration request including the account information "AI1" to the server 50 in T772. After this, processes same as T112 to T192 of FIG. 6 are executed. As a result, the registration of the MFP 10 in the sever 50 is completed.

According to this embodiment, the registration instruction is sent from the PC 90 to the MFP 10 by the first user's selection of the registration button included in the predetermined screen displayed in the PC 90, in response to the first user's login to the MFP 10 from the PC 90. Due to this, the PC 90 does not need to search for the MFP 10, and the first user does not need to select the device name "N" of the MFP 10 from among a plurality of device names displayed as the search result. Thus, the convenience for the user can be improved.

Variant of Third Embodiment

Next, a variant of the third embodiment will be described. In this variant, similarly to the second embodiment, the administrator of the MFP 10 stores the account information of the respective users in the table 38 in advance. Further, processes corresponding to T700 to 1750 of FIG. 13 are performed by the administrator's operation of the MFP 10. In this case, firstly the administrator of the MFP 10 inputs administrator's own user ID and password to the PC 90 and logs in to the MFP 10 from the PC 90. In this case, the MFP 10 receives the login instruction form the PC 90 in T700, and sends a user selection list including the respective user IDs in the table 38 to the PC 90, instead of T712.

The PC 90 displays the user selection list instead of T714, and receives a selection of the user ID "User1" among the user selection list by the administrator instead of T716. Then, in T718, the PC 90 sends a registration instruction including the selected user ID "User1" to the MFP 10.

In a case of receiving the registration instruction from the PC 90, the MFP 10 executes T720 to T730. In this case, processes same as T70 to T74 of FIG. 5 are executed. Then, in a case of receiving the management ID "Printer1" and the URL "U1" from the server 50 in T740, the MFP 10 acquires the account information "AI1", which is associated with the selected user ID "User1" included in the registration instruction received in T718, from the table 38. Here, the account information "AI1" is first user's email address. Then, instead of T750, the MFP 10 sends an email including the URL "U1" with the account information "AI1" as a destination.

As a result, the email is received in the PC used by the first user (for example, the PC 90). When the first user selects the URL "U1" in the email, 1760 to T772 are executed. Subsequent processes hereafter are same as in the third embodiment (that is, T112 to T192 of FIG. 6).

According to the present variant, primary operations for registering the MFP 10 are executed by the administrator, and thus the first user can register the MFP 10 in the server 50 simply by selecting the URL "U1" in the received email and inputting the account information "AI1" in T770. Thus, the convenience for the user can be improved.

(Variant 1) In the above embodiments, the MFP 10 receives the registration instruction by receiving the registration instruction from the PC 90 (T42 of FIG. 5, T642 of FIG. 12, T718 of FIG. 13). Instead of this, the registration instruction may be received by the operation unit 12 being operated by the first user.

(Variant 2) In the above embodiments, the MFP 10 sends the server 50 the registration request including the permitted function information "FN1", which is obtained from the limitation information corresponding to the first user (T60 in FIG. 5, T660 in FIG. 12, T730 in FIG. 13). Instead, the MFP 10 may send the server 50 a registration request including the limitation information itself corresponding to the first user (for example, the information indicating that the first user is permitted to use the monochrome print but is not permitted to use the color print, the color scan, and the monochrome scan). That is, in the present variant, "second process specifying information" is information identical to "first process specifying information".

(Variant 3) Following processes may be executed instead of the processes of FIG. 4. The PC 95 firstly sends the login instruction including the user ID "User1" and the password "P1" inputted by the first user to the MFP 10. In response to receiving the login instruction from the PC 95, the MFP 10 specifies the limitation information associated with the user ID "User1" and the password "P1" included in the login instruction in the table 38. Then, the MFP 10 generates the setting screen data representing the setting screen indicating only the monochrome print permitted in the specified limitation information, and sends the generated setting screen data to the PC 95. The PC 95 displays the setting screen in response to receiving the setting screen data from the MFP 10. In this case, the first user cannot select the color print in the setting screen, and can only select the monochrome print. In this variant as well, the user may be enabled to use only the image process(es) that the administrator had permitted.

(Variant 4) In the above embodiments, the server 50 executes intermediation of printing between the MFP 10 and the PC 90 and the like, however, it may execute intermediation of scanning instead. In this case, in T60 of FIG. 5, the MFP 10 sends the server 50 the permitted function information "FN1" indicating a scan process of which use is permitted to the first user. Due to this, in T250 of FIG. 7 or T450 of FIG. 8, a setting screen in which the scan process specified by the permitted function information "FN1" can be selected is displayed. In response to receiving a scan setting from the PC 90 used by the first user, the server 50 sends a scan instruction including the scan setting to the MFP 10 instead of T270 to T310 of FIG. 7. As a result, the MFP 10 executes the scan process according to the scan setting included in the scan instruction, and sends its scan data to the server 50. In this case, the server 50 sends this scan data to the PC 90. In this variant, the color scan and the monochrome scan are examples of "plurality of image processes".

(Variant 5) In S58 of FIG. 9, the CPU 32 may not store the management ID "Printer1". In this case, when the CPU 32 receives the job notification from the server 50, the CPU 32 determines YES in S105 and proceeds to S110 in a case where the login state information associated with the registration state information "Registered" indicates "Login". In this variant, the registration state information "Registered" is an example of "completion information". Further, in another variant, the registration state information and the management ID may not be stored in S58 of FIG. 9, and the processes of S105 and S107 of FIG. 10 may be omitted. In this case, in a case where YES is determined in S100, the MFP 10 sends the print job request to the server 50 in S110. In this variant, "store completion information in association with target user information in the memory" and "determine whether a state of the image processing device is a first login state" may be omitted.

(Variant 6) The MFP10 may not store the table 38 in the memory 34. In this case, the communication system 2 may further comprise a storage server that is configured separately from the MFP 10 and stores the table 38. In response to receiving the registration instruction from the PC 90 in T42 of FIG. 5, the MFP 10 sends a table request for requesting the table 38 to the storage server, and receives the table 38 from the storage server. Then, the MFP 10 creates the permitted function information "FN1" by using the received table 38. Further, the MFP 10 may store the respective pieces of information in the storage server by sending the respective pieces of information to the storage server in T172 of FIG. 6 (S58 of FIG. 9). In the present variant, a memory in the storage server is an example of "memory".

(Variant 7) "Communication device" is not limited to the MFP 10, and may be a printer capable of executing only print process, a scanner capable of executing only scan process, or a device capable of executing a process different from the print process and the scan process (such as a PC, a server, etc.).

(Variant 8) In the above embodiments, the processes of FIGS. 4 to 10, FIG. 12, and FIG. 13 are implemented by software (i.e., the program 36), however, at least one of these processes may be implemented by hardware such as a logic circuit.

What is claimed is:

1. An image processing device comprising:
an image process executing unit configured to execute a plurality of image processes; and
a processor:
a storage storing computer-readable instructions that, when executed by the processor, cause the image processing device to:
cause the image process executing unit to execute a first image process among the plurality of image processes, in a case where an execution of the first image process permitted to be used by a target user is instructed from the target user not via a server,
wherein it is specified based on a memory that the first image process is permitted to be used by the target user,
the memory is capable of storing plural pieces of process specifying information corresponding to a plurality of users, and
each of the plural pieces of process specifying information is information for specifying one or more image processes permitted to be used by the user corresponding to the process specifying information among the plurality of image processes which are executable by the image process executing unit;
receive an input of a registration instruction for registering information for the target user to start a use of the image processing device via the server;
acquire first process specifying information corresponding to the target user among the plural pieces of process specifying information in the memory, in a case where the input of the registration instruction is received;
send, to the server, a registration request including second process specifying information obtained by using the acquired first process specifying information,
wherein the second process specifying information is information for specifying one or more image processes permitted to be used by the target user among the plurality of image processes, and
in the server, in a case where the registration request is received from the image processing device, the second process specifying information included in the registration request is registered;
receive an execution request of a second image process from the server, in a case where an execution of the second image process is instructed to the server from the target user via a terminal device, the second image process being an image process among the one or more image processes specified by the registered second process specifying information; and
cause the image process executing unit to execute the second image process, in a case where the execution request is received from the server.

2. The image processing device as in claim 1, wherein:
for each of the plurality of users, the memory is capable of storing user information for identifying the user and the process specifying information corresponding to the user in association with each other, and
in a case where the input of the registration instruction is received while a state of the image processing device is a login state indicating that a login operation of inputting target user information for identifying the target user has been received in the image processing device after the target user information had been stored in the memory, the first process specifying information associated with the target user information among the plural pieces of process specifying information in the memory is acquired.

3. The image processing device as in claim 2, wherein
for each of the plurality of users, the memory is capable of storing the user information for identifying the user, the process specifying information corresponding to the user, and account information used for a login operation to the server by the user in association with each other,
the registration instruction includes logged-in account information by which the server is currently logged in,
wherein the computer-readable instructions, when executed by the processor, further causes the image processing device to:
determine whether target account information associated with the target user information in the memory is identical to the logged-in account information included in the registration instruction, in the case where the input of the registration instruction is received while the state of the image processing device is the login state using the target user information,
wherein in a case where it is determined that the target account information is identical to the logged-in account information:

the first process specifying information associated with the target user information is acquired, and
the registration request including the second process specifying information obtained by using the acquired first process specifying information is sent to the server, and
in a case where it is determined that the target account information is not identical to the logged-in account information, the first process specifying information is not acquired and the registration request is not sent.

4. The image processing device as in claim 1, wherein
for each of the plurality of users, the memory is capable of storing the process specifying information corresponding to the user and account information used for a login operation to the server by the user in association with each other, and
the first process specifying information associated with target account information among the plural pieces of process specifying information is acquired, in a case where the input of the registration instruction including the target account information is received, the target account information being information used for a login operation to the server by the target user.

5. The image processing device as in claim 1, wherein
the input of the registration instruction includes receiving the registration instruction sent by the terminal device.

6. The image processing device as in claim 1, wherein
for each of the plurality of users, the memory is capable of storing user information for identifying the user and the process specifying information corresponding to the user in association with each other,
the computer-readable instructions, when executed by the processor, further causes the image processing device to:
store completion information in association with target user information identifying the target user in the memory after the registration request has been sent to the server, the completion information indicating that a registration to the server has been completed; and
in a case where the execution request is received from the server, determine whether a state of the image processing device is a first login state, the first login state being a state indicating that a login operation of inputting the target user information associated with the completion information in the memory has been received in the image processing device after the target user information had been stored in the memory using the target user information associated with the completion information in the memory,
wherein in a case where it is determined that the state of the image processing device is the first login state, the second image process is executed by the image process executing unit, and
in a case where it is determined that the state of the image processing device is not the first login state, the second image process is not executed by the image process executing unit.

7. The image processing device as in claim 6, wherein
the second image process is executed by the image process executing unit, in a case where the state of the image processing device shifts to the first login state from a second login state after it has been determined that the state of the image processing device is not the first login state due to the state of the image processing device being the second login state, the second login state being a state indicating that a login operation of inputting the user information different from the target user information has been received in the image processing device after the user information different from the target user had been stored in the memory.

8. The image processing device as claim 1, wherein the image processing device further comprises the memory.

9. A non-transitory computer-readable recording medium storing computer-readable instructions for an image processing device, the image processing device comprising:
an image process executing unit configured to execute a plurality of image processes; and
a processor,
wherein the computer-readable instructions, when executed by the processor, cause the image processing device to:
cause the image process executing unit to execute a first image process among the plurality of image processes, in a case where an execution of the first image process permitted to be used by a target user is instructed from the target user not via a server,
wherein it is specified based on a memory that the first image process is permitted to be used by the target user,
the memory is capable of storing plural pieces of process specifying information corresponding to a plurality of users, and
each of the plural pieces of process specifying information is information for specifying one or more image processes permitted to be used by the user corresponding to the process specifying information among the plurality of image processes which are executable by the image process executing unit;
receive an input of a registration instruction for registering information for the target user starting a use of the image processing device via the server;
acquire first process specifying information corresponding to the target user among the plural pieces of process specifying information in the memory, in a case where the input of the registration instruction is received;
send, to the server, a registration request including second process specifying information obtained by using the acquired first process specifying information,
wherein the second process specifying information is information for specifying one or more image processes permitted to be used by the target user among the plurality of image processes, and
in the server, in a case where the registration request is received from the image processing device, the second process specifying information included in the registration request is registered;
receive an execution request of a second image process from the server, in a case where an execution of the second image process is instructed to the server from the target user via a terminal device, the second image process being an image process among the one or more image processes specified by the registered second process specifying information; and
cause the image process executing unit to execute the second image process, in a case where the execution request is received from the server.

10. The non-transitory computer-readable recording medium as in claim 9, wherein:
for each of the plurality of users, the memory is capable of storing user information for identifying the user and the process specifying information corresponding to the user in association with each other, and in a case where the input of the registration instruction is received while a state of the image processing device is a login state indicating that a login operation of inputting target user information for identifying the target user has been received in the image processing device after the target user information had been stored in the memory, the first process specifying information associated with the target user information among the plural pieces of process specifying information in the memory is acquired.

11. The non-transitory computer-readable recording medium as in claim 10, wherein
for each of the plurality of users, the memory is capable of storing the user information for identifying the user, the process specifying information corresponding to the user, and account information used for a login operation to the server by the user in association with each other,
the registration instruction includes logged-in account information by which the server is currently logged in,
the computer-readable instructions, when executed by the processor, further cause the image processing device to:
determine whether target account information associated with the target user information in the memory is identical to the logged-in account information included in the registration instruction, in the case where the input of the registration instruction is received while the state of the image processing device is the login state using the target user information,
wherein in a case where it is determined that the target account information is identical to the logged-in account information:
the first process specifying information associated with the target user information is acquired, and
the registration request including the second process specifying information obtained by using the acquired first process specifying information is sent to the server, and
in a case where it is determined that the target account information is not identical to the logged-in account information, the first process specifying information is not acquired and the registration request is not sent.

12. The non-transitory computer-readable recording medium as in claim 9, wherein
for each of the plurality of users, the memory is capable of storing the process specifying information corresponding to the user and account information used for a login operation to the server by the user in association with each other, and
the first process specifying information associated with target account information among the plural pieces of process specifying information is acquired, in a case where the input of the registration instruction including the target account information is received, the target account information being information used for a login operation to the server by the target user.

13. The non-transitory computer-readable recording medium as in claim 9, wherein
the input of the registration instruction includes receiving the registration instruction sent by the terminal device.

14. The non-transitory computer-readable recording medium as in claim 9, wherein
for each of the plurality of users, the memory is capable of storing user information for identifying the user and the process specifying information corresponding to the user in association with each other, the computer-readable instructions, when executed by the processor, further cause the image processing device to:

store completion information in association with target user information identifying the target user in the memory after the registration request has been sent to the server, the completion information indicating that a registration to the server has been completed; and in a case where the execution request is received from the server, determine whether a state of the image processing device is a first login state, the first login state being a state indicating that a login operation of inputting the target user information associated with the completion information in the memory has been received in the image processing device after the target user information had been stored in the memory, wherein in a case where it is determined that the state of the image processing device is the first login state, the second image process is executed by the image process executing unit, and in a case where it is determined that the state of the image processing device is not the first login state the second image process is not executed by the image process executing unit.

15. The non-transitory computer-readable recording medium as in claim 14, wherein the second image process is executed by the image process executing unit, in a case where the state of the image processing device shifts to the first login state from a second login state after it has been determined that the state of the image processing device is not the first login state due to the state of the image processing device being the second login state, the second login state being a state indicating that a login operation of inputting the user information different from the target user information has been received in the image processing device after the user information different from the target user has been stored in the memory.

16. The non-transitory computer-readable recording medium as claim 9, wherein the image processing device further comprises the memory.

17. A method comprising:

causing an image process executing unit, which is configured to execute a plurality of image processes, of an image processing device to execute a first image process among the plurality of image processes, in a case where an execution of the first image process permitted to be used by a target user is instructed from the target user not via a server, wherein it is specified based on a memory that the first image process is permitted to be used by the target user, the memory is capable of storing plural pieces of process specifying information corresponding to a plurality of users, and each of the plural pieces of process specifying information is information for specifying one or more image processes permitted to be used by the user corresponding to the process specifying information among the plurality of image processes which are executable by the image process executing unit;

receiving an input of a registration instruction for registering information for the target user starting a use of the image processing device via the server;

acquiring first process specifying information corresponding to the target user among the plural pieces of process specifying information in the memory, in a case where the input of the registration instruction is received;

sending, to the server, a registration request including second process specifying information obtained by using the acquired first process specifying information, wherein the second process specifying information is information for specifying one or more image processes permitted to be used by the target user among the plurality of image processes, and in the server, in a case where the registration request is received from the image processing device, the second process specifying information included in the registration request is registered;

receiving an execution request of a second image process from the server, in a case where an execution of the second image process is instructed to the server from the target user via a terminal device, the second image process being an image process among the one or more image processes specified by the registered second process specifying information; and causing the image process executing unit to execute the second image process, in a case where the execution request is received from the server.

* * * * *

UNITED STATES PATENT AND TRADEMARK OFFICE
CERTIFICATE OF CORRECTION

PATENT NO. : 10,740,044 B2
APPLICATION NO. : 15/939458
DATED : August 11, 2020
INVENTOR(S) : Yongyong Ren It is certified that error appears in the above-identified patent and that said Letters Patent is hereby corrected as shown below:

In the Claims

Column 22, Claim 6, Lines 47-49:
Please delete "using the target user information associated with the completion information in the memory"

Signed and Sealed this
Twenty-seventh Day of June, 2023

Katherine Kelly Vidal
*Director of the United States Patent and Trademark Office*